(12) United States Patent
Akagi

(10) Patent No.: US 7,606,052 B2
(45) Date of Patent: Oct. 20, 2009

(54) FILTER DEVICE

(75) Inventor: Hirofumi Akagi, Tokyo (JP)

(73) Assignee: Tokyo Institute of Technology, Tokyo (JP)

( * ) Notice: Subject to any disclaimer, the term of this patent is extended or adjusted under 35 U.S.C. 154(b) by 56 days.

(21) Appl. No.: 10/534,250

(22) PCT Filed: Mar. 14, 2003

(86) PCT No.: PCT/JP03/03119

§ 371 (c)(1),
(2), (4) Date: Mar. 9, 2006

(87) PCT Pub. No.: WO2004/045055

PCT Pub. Date: May 27, 2004

(65) Prior Publication Data

US 2006/0227483 A1 Oct. 12, 2006

(30) Foreign Application Priority Data

Nov. 11, 2002 (JP) .................. PCT/JP02/11742
Nov. 14, 2002 (JP) .................. PCT/JP02/11888

(51) Int. Cl.
*H02M 1/12* (2006.01)
(52) U.S. Cl. ........................................... 363/40
(58) Field of Classification Search ............ 363/37, 363/39, 40, 41, 131
See application file for complete search history.

(56) References Cited

U.S. PATENT DOCUMENTS

| | | | | |
|---|---|---|---|---|
| 5,831,842 A | * | 11/1998 | Ogasawara et al. | 363/40 |
| 5,852,558 A | * | 12/1998 | Julian et al. | 363/132 |
| 5,999,423 A | | 12/1999 | Steinke et al. | |
| 6,028,405 A | * | 2/2000 | Kume et al. | 318/254 |
| 6,122,184 A | * | 9/2000 | Enjeti et al. | 363/47 |
| 6,154,378 A | * | 11/2000 | Peterson et al. | 363/37 |
| 6,208,098 B1 | * | 3/2001 | Kume et al. | 318/254 |

(Continued)

FOREIGN PATENT DOCUMENTS

EP 0899859 A 3/1999

(Continued)

OTHER PUBLICATIONS

Hiroshi Hasegawa et al., "A Voltage-Source PWM Inverter System Characterised by Sinusoidal Output Voltage With Neithr Common-Mode Nor Normal Mode Voltage ~Design and Performance of a Passive EMI Filter-" Tokyo Institute of Technology.

(Continued)

*Primary Examiner*—Adolf Berhane
(74) *Attorney, Agent, or Firm*—Lowe Hauptman Ham & Berner, LLP

(57) ABSTRACT

A filter device that suppresses electromagnetic interference generated in an alternating current circuit connected to a power converter with an alternating current output includes: a common mode choke connected to between any one terminal at an input side, an output side, or a direct current link of the power converter and input terminals of the alternating current circuit; and a connecting element that connects an outgoing line from a neutral point of the alternating current circuit to a reference potential point having little potential variation at an upstream of the common mode choke.

18 Claims, 21 Drawing Sheets

U.S. PATENT DOCUMENTS

| | | | | |
|---|---|---|---|---|
| 6,377,479 | B1 * | 4/2002 | Ayano et al. | 363/40 |
| 6,690,565 | B2 * | 2/2004 | Montreuil | 361/232 |
| 6,775,157 | B2 * | 8/2004 | Honda | 363/39 |
| 7,274,576 | B1 * | 9/2007 | Zargari et al. | 363/39 |

FOREIGN PATENT DOCUMENTS

| | | | | |
|---|---|---|---|---|
| EP | 1085649 | A | | 3/2001 |
| JP | 11220898 | | | 8/1999 |
| JP | 2001069762 | | | 3/2001 |
| JP | 2001069762 | A | * | 3/2001 |
| JP | 2001238433 | | | 8/2001 |
| JP | 2001245477 | | | 9/2001 |
| JP | 2001352792 | | | 12/2001 |
| JP | 2007336766 | A | * | 12/2007 |
| WO | 2004045055 | | | 5/2004 |
| WO | WO 2006038545 AL | | * | 4/2006 |

OTHER PUBLICATIONS

Takafumi Doumoto et al., "Output Characteristics of a NPC(3-Level) PWM Inverter Equipped With a Passive EMI Filter" Tokyo Institute of Technology.

Hiroshi Hasegawa et al., "Effects of a Passive EMI Filter on Surge Voltage at Motor Terminals When a Motor is Connected With an Inverter Via a 100-Meter-Long Cable." Tokyo Institute of Technology.

Takafumi Doumoto et al., "A Passive EMI Filter Making Use of the Motor Neutral Line", Tokyo Institute of Technology.

Satoshi Ogasawara et al., "Measurement and Reduction of EMI Radiated by a PWM Inverter-Fed AC Motor Drive System" TRANS. IEE of Japan, vol. 116-D, No. 12, Dec. 1996.

Isao Takahashi et al., "Active EMI Filter for Switching Noise of High Frequency Inverters" Nagaoka University of Technology, 1997 IEEE.

Fei Wang, "Motor Shaft Voltages and Bearing Currents and Their Reduction in Mulitlevel Medium-Voltage PWM Voltage-Source-Inverter Drive Applications" IEEE Transactions on Industry Applications, vol. 36, No. 5, Sep./Oct. 2000.

Peter W. Hammond, "A New Approach to Enhance Power Quality for Medium Voltage AC Drives" IEEE Transactions on Industry Applications, vol. 33, No. 1, Jan./Feb. 1997.

Hiroshi Hasegawa et al., A Three-Phase Voltage-Source PWM Inverter System Chracterized by Sinusoidal Output Voltage With Neither Common-Mode Voltage Nor Normal-Mode Voltage-Design and Performance of a Passive EMI Filter.

EP Search Report for 03710375.1 mailed Oct. 20, 2008.

* cited by examiner

Fig. 5
(a)
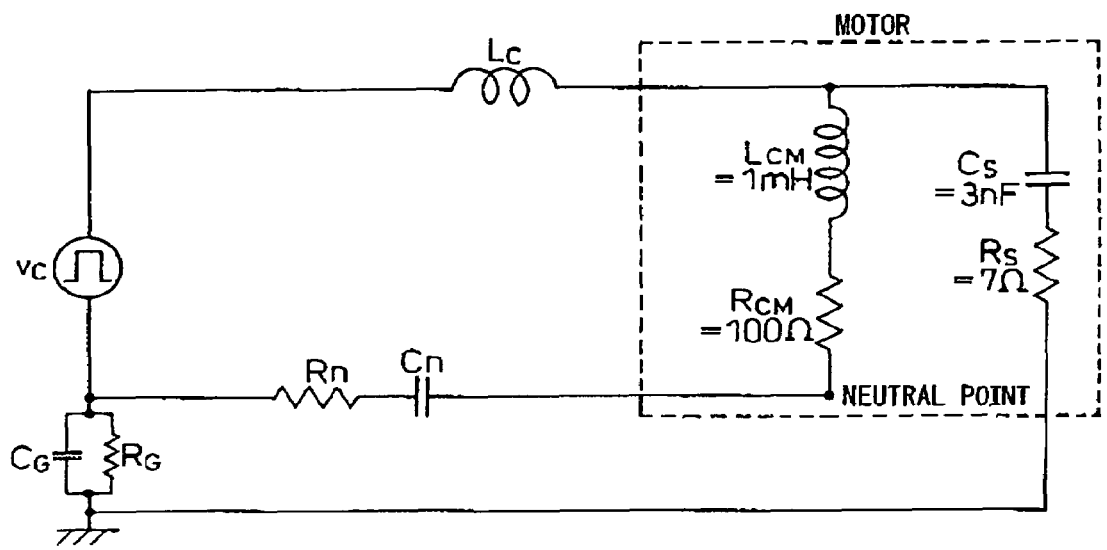
(b)
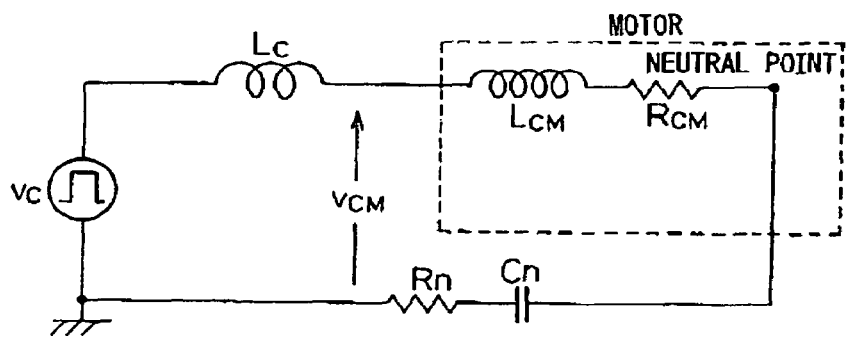

Fig.12
(a)
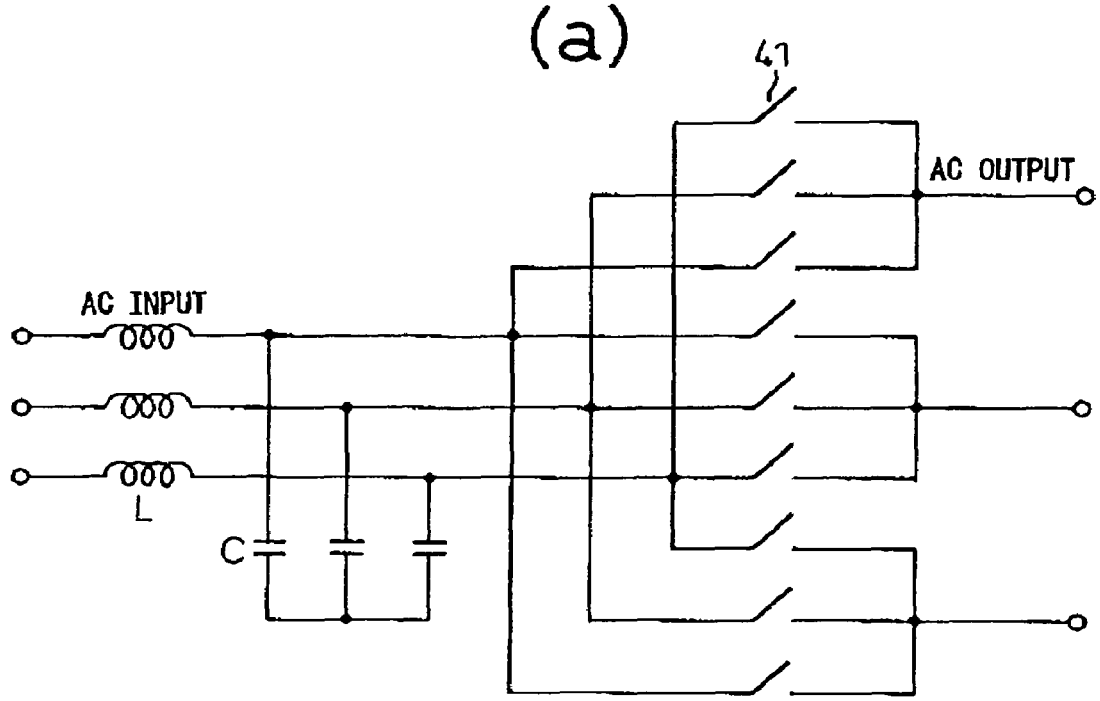
(b)
(c)
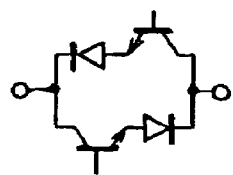
(d)
(e)
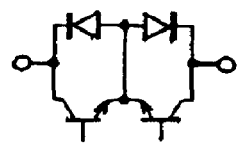

FILTER DEVICE

RELATED APPLICATIONS

The present application is based on International Application No. PCT/JP2003/003119, filed Mar. 14, 2003, and claims priority from, International Application Numbers PCT/JP2002/11742 and PCT/JP2002/11888, filed Nov. 11 and 14, 2002, respectively, the disclosures of which are hereby incorporated by reference herein in its entireties.

TECHNICAL FIELD

The present invention relates to a filter device that suppresses the occurrence of electromagnetic interference in an alternating current circuit that is connected to an alternating current output of a power converter.

BACKGROUND ART

Along with an increase in the switching speeds of power semiconductor devices such as IGBTs (insulated gate bipolar transistors), the torque control and speed control of an alternating current motor variable-speed drive system including these power semiconductor devices has become better, which makes a large contribution to energy savings in the total system.

On the other hand, electromagnetic interference (EMI) attributable to high-speed switching in a power semiconductor device is becoming a crucial issue in the our highly information-oriented and computerized society. For example, in an inverter-driven alternating current motor, a shaft voltage is generated between the motor shaft and the motor frame. The resultant high-frequency leakage current that flows through parasitic capacitors of the motor generates electric corrosion in the bearings. This can cause problems in the rotation of the motor and has the potential of being a large noise source in the power line Internet, in which PCs communicate with other devices through the power line, which will come into practical use in the future.

As a countermeasure against EMI in the power electronics devices, there has already been proposed, for example, an EMI filter that suppresses a rapid change in the current and voltage by using a reactor or a filter, as described in "A method of measuring EMI generated by an alternating current motor drive system using a PWN inverter, and a method of decreasing the EMI", by Ogasawara and two other engineers, in the IEEJ (the Institute of Electrical Engineers of Japan) Transactions on Industry Applications, 1996, Vol. 116, No. 12, pp. 1211-1219.

As a countermeasure against the EMI in power electronics devices, there has also been proposed an EMI filter that offsets a common mode voltage of an inverter by using active elements like transistors, as described in "Active EMI Filter for Switching Noise of High Frequency Inverters", by I. Takahashi and three other engineers, the Proceeding of Power Conversion Conference (PCC)-Nagaoka, 1997, pp. 331-334.

As a countermeasure against the EMI in the power electronics devices, there has also been proposed an EMI passive filter that changes a phase voltage into a sinusoidal wave, as described in "Design and characteristics of a three-phase sinusoidal wave voltage output PEM inverter system-passive EMI filter that does not generate a common mode voltage", by Hasegawa and two other engineers, in the IEEJ Transactions on Industry Applications, 2002, Vol. 122, No. 8, pp. 845-852. According to this technique, an EMI filter is constructed using only passive elements such as a normal mode choke (what is called an alternating current reactor), a common mode choke (what is called a zero-phase reactor), a resistor, and a capacitor, thereby changing three-phase line-to-neutral voltages and three-phase line-to-line voltages at the ac terminals of the inverter into sinusoidal waves. Therefore, substantially all the shaft voltage can be eliminated.

As a countermeasure against the EMI in the power electronics devices, there has also been described a common mode circuit that grounds the neutral point of a motor and grounds the neutral point at the direct link, in "Motor Shaft Voltage and Bearing Currents and Their Reduction in Multi-level Medium-Voltage PWM Voltage-Source-Inverter Drive Applications", by Fei Wang, IEEE transaction on Industry Applications, September and October, 2000, Vol. 36, No. 5.

In Japanese Patent Application Unexamined Publication No. 2001-352792, there has been proposed a technique of smoothing a voltage, having relatively large amplitude, of a rectangular wave at the neutral point with a view to decreasing the noise generated by an alternating current motor and preventing rotation problems.

According to the above conventional techniques, there has been provided a certain effect of suppressing the EMI, but at an insufficient level.

Among the above techniques, the EMI filter using a active elements such as transistors requires complementary transistors. Further, due to the limit of a withstand voltage of obtainable transistors, this EMI filter can be applied to only to a 200 volt or less inverter. The EMI also has a complex structure and, accordingly, has a high manufacturing cost.

On the other hand, an EMI passive filter having a normal mode choke and a common mode choke can change the output phase voltage and the line voltage of the inverter into a sinusoidal wave, and therefore, can suppress the shaft voltage. However, because a normal mode choke is necessary, the device becomes large and has a high manufacturing cost.

Therefore, in the light of the above problems, it is an object of the present invention to provide a compact low-price filter device having strong effect on suppressing electromagnetic interference in a filter device that suppresses the electromagnetic interference generated in an alternating current circuit connected to a power converter with an alternating current output.

DISCLOSURE OF THE INVENTION

An alternating current motor is used as an example of an alternating current circuit. When a common mode voltage applied to input terminals of the alternating current motor is set to zero, a shaft voltage of the alternate motor becomes zero, and a leak current (ground line current) also becomes zero. The present invention is based on the idea that a shaft voltage and a leak current are set near to zero by setting the common mode voltage applied to these input terminals to as close to zero as possible, thereby suppressing the electromagnetic interference. Based on the configuration according to the present invention explained below, it becomes possible to bring the common mode voltage applied to the input terminals of the alternating current motor (the alternating current circuit) close to zero.

According to a filter device of the present invention, a common mode choke is installed at any one of an input side, an output side, and a direct current link of a power converter that is connected to an alternating current circuit. At the same time, an outgoing line from the neutral point of the alternating current circuit is connected to a reference potential point, having little voltage variation, present at an upstream of the common mode choke, thereby forming a closed loop.

As the alternating current circuit, there are an induction motor, a synchronous motor, an electrical apparatus equipped with a converter having a Y-connection, such as a UPS (uninterruptible power supply) system, or a solar cell system, a fuel cell system, or various kinds of battery systems connected to a power supply equipped with a converter having a Y-connection.

In order to achieve the above object, according to a first aspect of the present invention, a common mode choke is connected between alternating current output terminals of a power converter with an alternating current output and input terminals of an alternating current circuit. At the same time, an outgoing line from the neutral point of the alternating current circuit is connected to a power source system side of the power converter, that is, a reference potential point having little potential variation present at the upstream of the power converter, preferably via a passive element including a capacitor and a resistor connected in series.

In order to achieve the above object, as a modification of the first aspect of the present invention, there is provided a filter device that suppresses electromagnetic interference generated in an alternating current circuit connected to a power converter with an alternating current input and an alternating current output. In the filter device, a common mode choke is connected to an alternating current input terminal side of a power converter with an alternating current input and an alternating current output. At the same time, an outgoing line from the neutral point of the alternating current circuit is connected to a power source system side of the common mode choke, that is, a reference potential point having little potential variation present at the upstream of the common mode choke, preferably via a passive element including a capacitor and a resistor connected in series.

In order to achieve the above object, according to a second aspect of the present invention, there is provided a filter device that suppresses electromagnetic interference generated in an alternating current circuit connected to a power converter with an alternating current input and an alternating current output. In the filter device, a common mode choke is provided at a direct current input terminal side of a power converter with a direct current input and an alternating current output connected to input terminals of the alternating current circuit. At the same time, an outgoing line from the neutral point of the alternating current circuit is connected to a direct current power source side of the common mode choke, that is, a reference potential point having little potential variation present at the upstream of the common mode choke, preferably via a passive element including a capacitor and a resistor connected in series.

In order to achieve the above object, as a modification of the second aspect of the present invention, there is provided a filter device that suppresses electromagnetic interference generated in an alternating current circuit connected to a power converter system including a power converter with an alternating current input and a direct current output and a power converter with a direct current input and an alternating current output. In this filter device, a common mode choke is connected to between direct current output terminals of the power converter with the alternating current input and the direct current output and direct current input terminals of the power converter with the direct current input and the alternating current output. At the same time, an outgoing line from the neutral point of the alternating current circuit is connected to a reference potential point having little potential variation at an alternating current input terminal side or the direct current output terminal side of the power converter with the alternating current input and the direct current output, preferably via a passive element including a capacitor and a resistor connected in series.

According to the present invention, the filter device has a common mode choke, and has a closed loop formed from the neutral point of the alternating current circuit to the reference potential point at the power source system side of the power converter. Based on this simple configuration, electromagnetic interference (EMI) can be effectively suppressed. Particularly, unlike the conventional example, the filter device according to the present invention does not require constituent elements such as a normal mode choke and transistors, and has a simple configuration. As a result, the filter device can be compact and can be provided at low cost.

BRIEF DESCRIPTION OF THE DRAWINGS

FIGS. 5 (*a*) and (*b*) are equivalent circuit diagrams of the filter device according to the first embodiment of the present invention; FIG. 5 (*a*) shows an equivalent circuit in a carrier frequency area in a common mode shown in FIG. 3; and FIG. 5 (*b*) is a simple equivalent circuit showing a further simplified circuit of the equivalent circuit shown in FIG. 5 (*a*).

FIGS. 12 (*a*) to (*e*) are circuit diagrams of a matrix converter.

BEST MODE FOR CARRYING OUT THE INVENTION

First, a filter device according to a first aspect of the present invention is explained.

Figure 1:
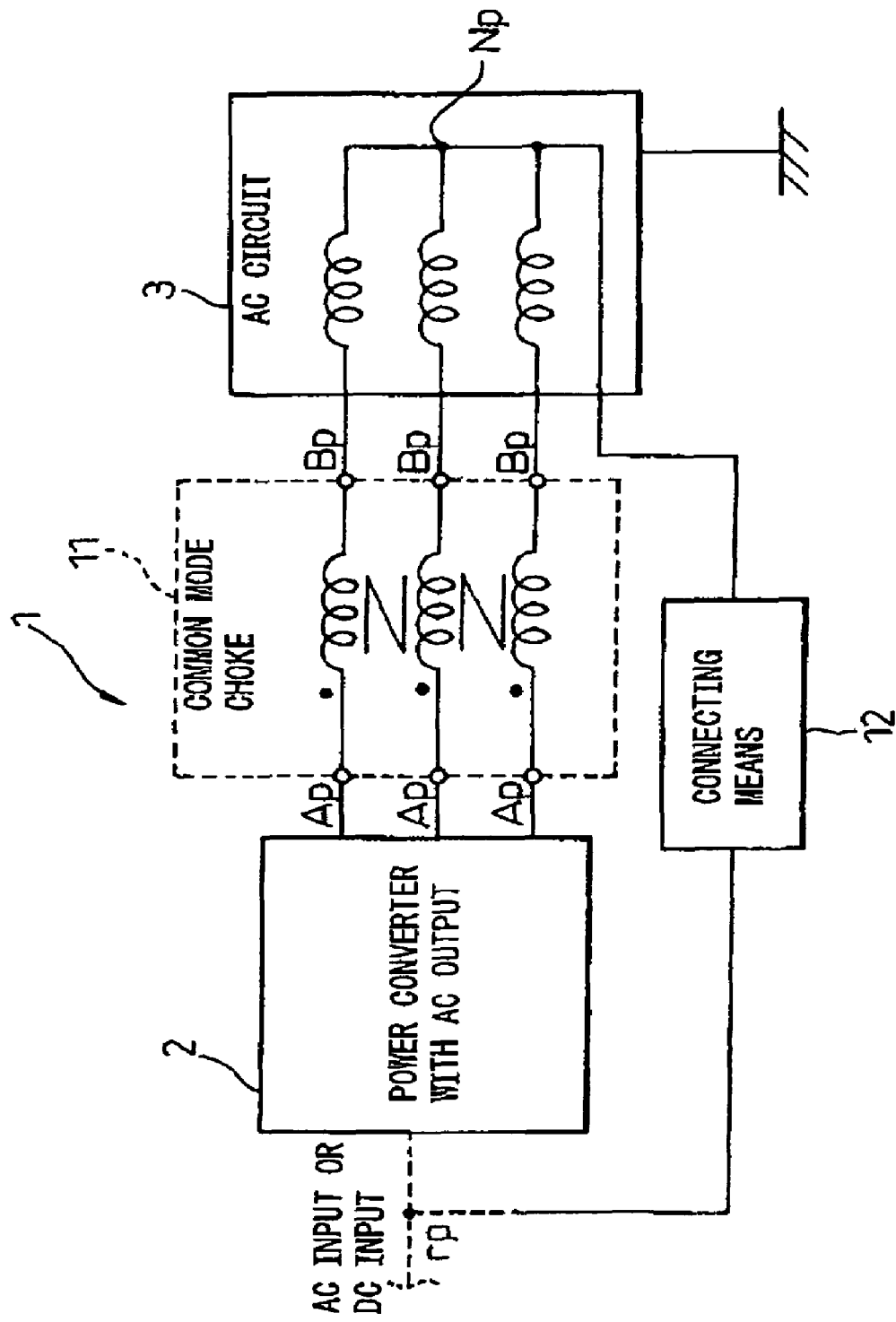
FIG. 1 is a system configuration diagram of a filter device according to a first aspect of the present invention.

FIG. 1 is a system configuration diagram of the filter device according to the first aspect of the present invention.

A filter device 1 that suppresses electromagnetic interference generated in an alternating current circuit 3 connected to a power converter 2 with an alternating current output includes a common mode choke 11 that is connected between alternating current output terminals Ap of the power converter 2 and input terminals Bp of the alternating current circuit 3, and a connecting means 12 that connects an outgoing line from the neutral point Np of the alternating current circuit 3 to a reference potential point rp having little potential variation present at a power source system side of the power converter 2.

The connecting means 12 preferably includes a capacitor and a resistor (not shown) that are connected in series. In this case, the series circuit of the capacitor and the resistor indicates a high-impedance characteristic for an output frequency component, and indicates a low-impedance characteristic for a frequency component of a common mode voltage.

As described above, the reference potential point rp can be at any point having little potential variation, at the power source system side of the power converter 2, that is, at the upstream of the power converter 2.

For example, when a power converter is a converter with an alternating current input and an alternating current output, the neutral point at the power source system side of the power converter can be the reference potential point.

When a power converter is a converter with a direct current input and an alternating current output, that is, when the power converter is an inverter, any one of a plus potential point, a minus potential point, and the neutral potential point if possible, at the direct current input side of the inverter can be the reference potential point. For example, when a power converter is a neutral point clamp inverter, any one of the plus potential point, the minus potential point, and the neutral point at the direct current input side of the neutral point clamp inverter can be the reference potential point.

According to the first aspect of the present invention, there is formed a closed loop from the neutral point Np of the alternating current circuit 3 to the reference potential point Rp at the power source system side of the power converter 2. Based on this configuration, the common mode choke 11 operates effectively. In other words, most of the common mode voltage that is generated from the power converter 2 is applied across the common mode choke 11, and no common mode voltage is generated at input terminals of the alternating current circuit 3. Consequently, a shaft voltage, a bearing current, and a leak current attributable to the common mode voltage are effectively suppressed. The filter device according to the present invention has a higher effect of suppressing electromagnetic interference than that of the devices according to the conventional techniques.

Figure 2:
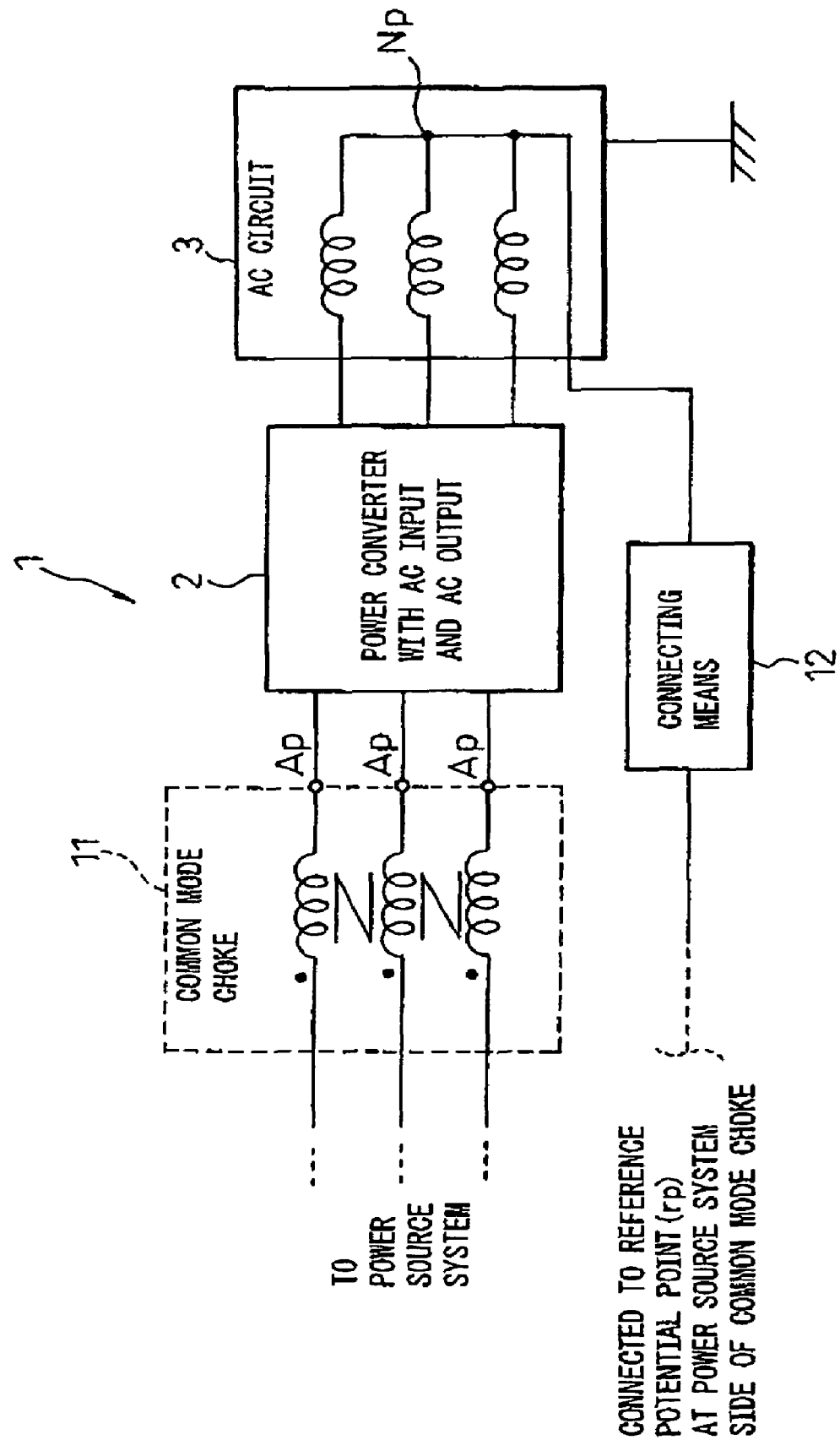
FIG. 2 is a system configuration diagram of a filter device according to a modification of the first aspect of the present invention.

FIG. 2 is a system configuration diagram of a filter device according to a modification of the first aspect of the present invention.

The filter device 1 that suppresses electromagnetic interference generated in the alternating current circuit 3 connected to the power converter 2 with an alternating current input and an alternating current output includes the common mode choke 11 that is connected to the alternating current input terminals Ap of the power converter 2, and the connecting means 12 that connects the outgoing line from the neutral point Np of the alternating current circuit 3 to a reference potential point having little potential variation Rp present at the power source system side of the common mode choke 11.

The connecting means 12 preferably includes a capacitor and a resistor (not shown) that are connected in series. In this case, the series circuit of the capacitor and the resistor indicates a high impedance characteristic for an output frequency component, and indicates a low impedance characteristic for a frequency component of a common mode voltage.

The reference potential point rp can be any one point having little potential variation at the power source system side of the common mode choke 11, that is, at the upstream of the common mode choke 11.

According to the modification of the first aspect of the present invention, there is formed a closed loop from the neutral point Np of the alternating current circuit 3 to the reference potential point rp at the power source system side of the common mode choke 11 connected to the alternating current input terminals Ap of the power converter 2. Therefore, effects similar to those obtained from the configuration of FIG. 1 are obtained.

Figure 3:
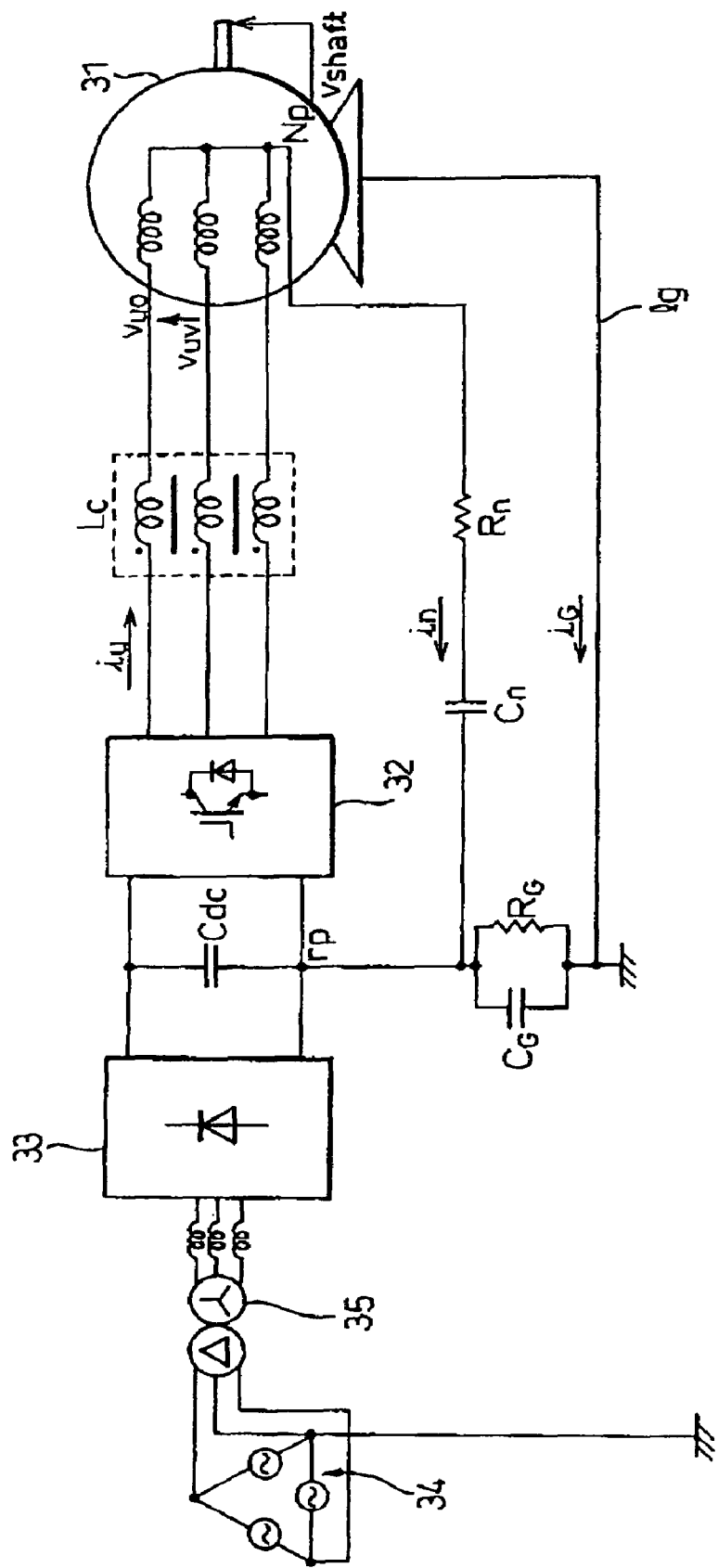
FIG. 3 is a circuit diagram of a filter device according to a first embodiment of the present invention.

FIG. 3 is a circuit diagram of a filter device according to a first embodiment of the present invention.

The present embodiment corresponds to the embodiment in the first aspect of the present invention. The alternate circuit is a three-phase induction motor 31. The power converter with the alternating current output is an inverter 32. The induction motor 31 is inverter driven by the inverter 32. In FIG. 3, a ground line lg of a frame of the induction motor 31 is also shown.

In order to ground the minus terminals at the direct current input side of the inverter 32, a capacitor $C_G$ and a resistor $R_G$ that are connected in parallel are provided. The capacitor $C_G$ operates as a capacitor grounding for a high frequency component, and the resistor $R_G$ operates as a resistor grounding for a low frequency component.

A direct current capacitor Cdc is provided to store power at the power source system side of the inverter 32.

The inverter 32 is connected to a diode rectifier 33 that rectifies a three-phase alternating current of the system voltage. The diode rectifier 33 uses a three-phase alternating current for the alternating current input, and is connected to a three-phase alternating current system voltage 34 via a converter 35 having a delta Y-connection. The alternating current input of the diode rectifier 33 can be a single-phase alternating current. Inverter home electric appliances such as an inverter air conditioner and an inverter refrigerator use the three-phase alternating current, for example.

According to the first embodiment of the present invention, there is one characteristic in that a common mode choke $L_C$ is connected to between the alternating current output terminals of the inverter 32 and the input terminals of the induction motor 31.

The common mode choke has three conductors that are wound up in the same direction in the case of three phases. Therefore, when a three-phase balanced load current flows, magnetic fluxes that are generated in a magnetic core are mutually offset by the load current, thereby changing the common mode choke into low impedance. However, when a load current other than a three-phase balanced load current flows, that is, when a common mode current flows, there is no work in mutually offsetting the magnetic fluxes. Therefore, the common mode choke becomes a high impedance. This means that the common mode current is suppressed by the common mode choke.

According to the first embodiment of the present invention, there is other characteristic in that the outgoing line from the neutral point Np of the induction motor 31 is connected to the reference potential point rp via the connecting means including a capacitor $C_n$ and a resistor $R_n$ that are connected in series.

As explained above, the reference potential point rp can be at the point having little potential variation present at the power source system side of the inverter 32 as the power converter. While the reference potential point rp is at the minus potential point of the inverter input (that is, at the minus potential point of the direct current capacitor Cdc) according to the present embodiment, the reference potential point rp can be also at the plus potential point of the inverter input (that is, at the plus potential point of the direct current capacitor Cdc).

Ideally, the fundamental current that flows from the neutral point Np of the induction motor 31 is zero and, therefore, the outgoing line from the neutral point Np of the induction motor 31 can be directly connected to the reference potential point rp. However, actually, the fundamental current flows out. Therefore, according to the present embodiment, the capacitor Cn is provided to prevent this fundamental current from flowing. The provision of the capacitor Cn entails a risk that resonance is generated depending on a condition of other parameter. Therefore, the resistor Rn is further provided as an attenuation resistor to suppress this resonance.

Figure 4:
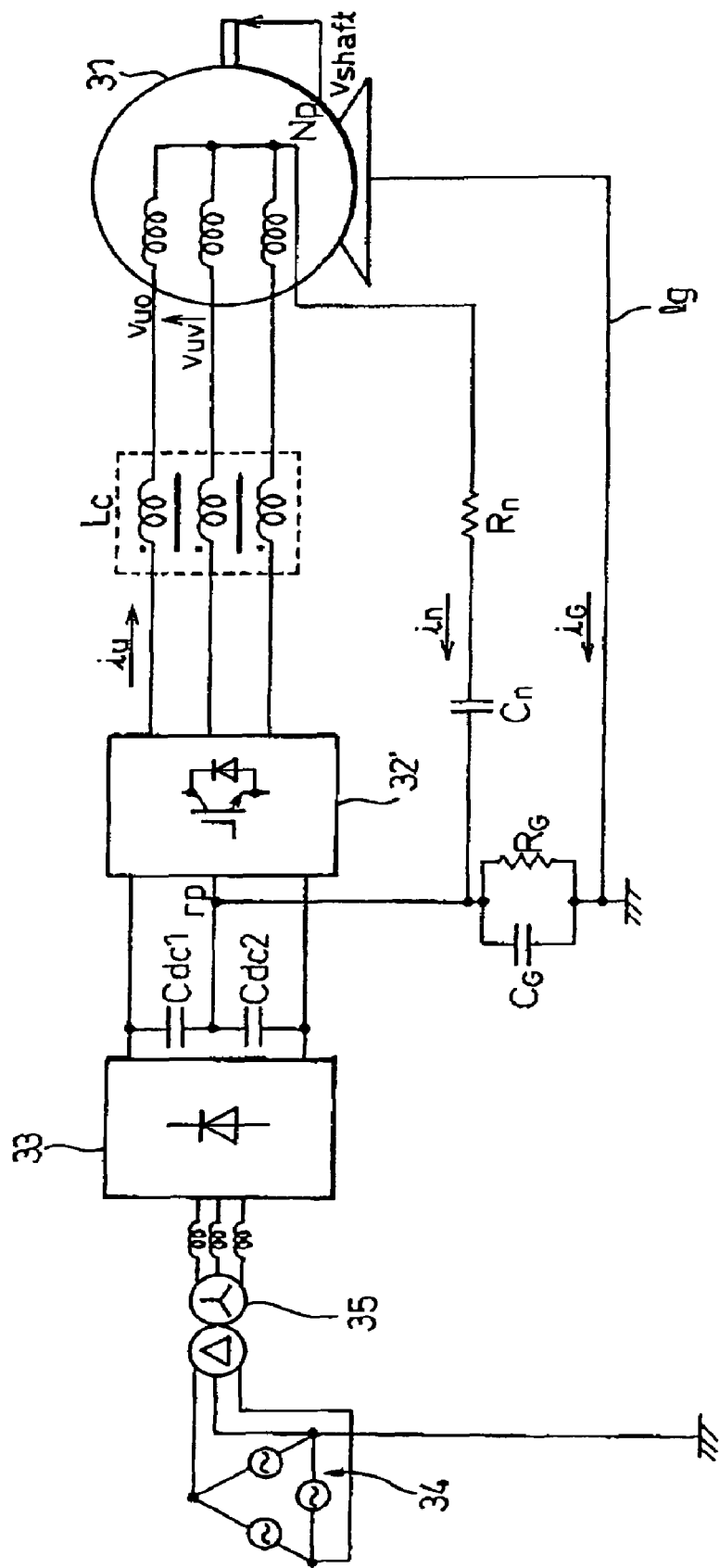
FIG. 4 is a circuit diagram of a filter device according to a modification of the first embodiment of the present invention.

FIG. 4 is a circuit diagram of a filter device according to a modification of the first embodiment of the present invention.

According to the present modification, the power converter with the alternating current output in the first embodiment shown in FIG. 3 is a neutral point clamp inverter 32'.

According to the present modification, the reference potential point rp is a clamp point of direct current capacitors Cdc1 and Cdc2. The reference potential point rp can be also the minus potential point or the plus potential point of the inverter input, as a matter of course.

In a large-capacity inverter, when plural direct current capacitors are connected in series because of a withstand voltage of the capacitors, any one of a plus potential point, a minus potential point, and a point where the potential is stable between series-connected direct current capacitors at the direct current input side of the inverter can be the reference potential point.

Referring to FIG. 3, again, according to the present embodiment, the rated output of the three-phase induction motor 31 is set to 200V and 3.7 kW. The capacity of the inverter is set to 5 kVA. The carrier frequency is set to 15 kHz. The three-phase alternating current system voltage 34 is three-phase 200V and 50 Hz. The common mode choke $L_c$=28 mH. The capacitor Cn=0.47 µF. The resistance Rn=30Ω. The capacitor $C_G$=0.1 µF. The resistance $R_G$=510Ω.

The numerical values of the parameters are not limited to the above according to the present invention. Other numerical values can be also set by taking into account characteristics, use, and objects of the device.

FIGS. 5 (a) and (b) are equivalent circuit diagrams of the filter device according to the first embodiment of the present invention. FIG. 5 (a) shows an equivalent circuit in a carrier frequency area in a common mode shown in FIG. 3. FIG. 5 (b) is a simple equivalent circuit showing a further simplified circuit of the equivalent circuit shown in FIG. 5 (a).

In general, a current $i_C$ that flows through a virtual ground line lg via a parasitic capacitor of an induction motor is irrelevant to the common mode impedance (zero-phase impedance) of the induction motor. Accordingly, it is known that the parasitic capacitor is present in a frame between terminals of the induction motor.

Regarding the filter device shown in FIG. 3 having the above parameters, the common mode impedance of the induction motor is determined by experiment, for example. In the experiment according to the present embodiment, a common mode voltage of the induction motor, and an amplitude and a phase difference of a neutral point current in are measured, using the neutral point Np of the induction motor as a reference potential. $L_{CM}$ is set to 1 mH, and $R_{CM}$ is set to 100Ω, based on the impedance characteristics in the carrier frequency area.

In the carrier frequency area, the impedance of the capacitor $C_G$ is sufficiently low and, therefore, can be disregarded or regarded as a short circuit.

A parasitic capacitor $C_S$ of the induction motor is set to 3 nF, by superimposing three power lines on the input terminals of the induction motor, applying a voltage between the power lines and the ground line, and measuring a voltage, and amplitude and a phase difference of current.

Based on the above arrangement, the equivalent circuit in the common mode shown in FIG. 3 can be expressed as shown in FIG. 5 (a). The equivalent circuit in the common mode shown in FIG. 4 can be similarly expressed as shown in FIG. 5 (a).

In FIG. 5 (a), the impedance of the parasitic capacitor $C_S$ of the induction motor is $1/\omega C_S$=3,500Ω. The combined impedance of $L_{CM}$, $R_{CM}$, $C_G$, and $R_G$ is 150Ω. Based on this, the equivalent circuit shown in FIG. 5 (a) can be further simplified as an LCR series circuit as shown in FIG. 5 (b).

In FIG. 5 (b), the amplitude ratio of the common mode voltage $V_{CM}$ at the input terminals of the induction motor to the common mode voltage $V_C$ at the alternating current output terminals of the inverter, $V_{CM}/V_C$, can be expressed as follows.

$$V_{CM}/V_C = |\{(R_{CM} + R_C + jwL_{CM} + 1/jwC_C)\}/$$
$$\{(R_{CM} + R_C + jw(L_{CM} + L_C) + 1/jwC_C\}| \cong 0.05$$

Therefore, the filter device according to the present embodiment can decrease the common mode voltage $V_{CM}$ at input terminals of the induction motor to 5% of the common mode voltage at alternating current output terminals of the inverter. In other words, the following is clear from the above expression. By structuring a closed loop from the neutral point Np of the induction motor 31 to the reference potential point Rp at the power source system side of the inverter 32 as shown in FIG. 3, the common mode choke 11 connected between alternating current output terminals of the inverter 32 and input terminals of the induction motor 31 operates effectively. Specifically, most of the common mode voltage generated from the inverter 32 is applied to both sides of the common mode choke $L_C$, and is not generated at input terminals of the induction motor 31. Consequently, a shaft voltage $V_{shaft}$ and a leak current $i_G$ of the induction motor 31 shown in FIG. 3 can be suppressed.

As explained above, according to the first embodiment of the present invention, the common mode voltage applied to input terminals of the induction motor can be set close to zero, thereby suppressing electromagnetic interference. According to the present embodiment, the filter device has such a simple configuration that only the common mode choke is provided, and the closed loop is formed from the neutral point of the alternating current circuit to the reference potential point at the power source system side of the power converter. Unlike the conventional example, the filter device according to the present embodiment does not require constituent elements such as a normal mode choke and transistors, and has a simple configuration. As a result, the filter device can be compact and can be provided at low cost.

A filter device according to a second embodiment of the present invention is explained next.

Figure 6:
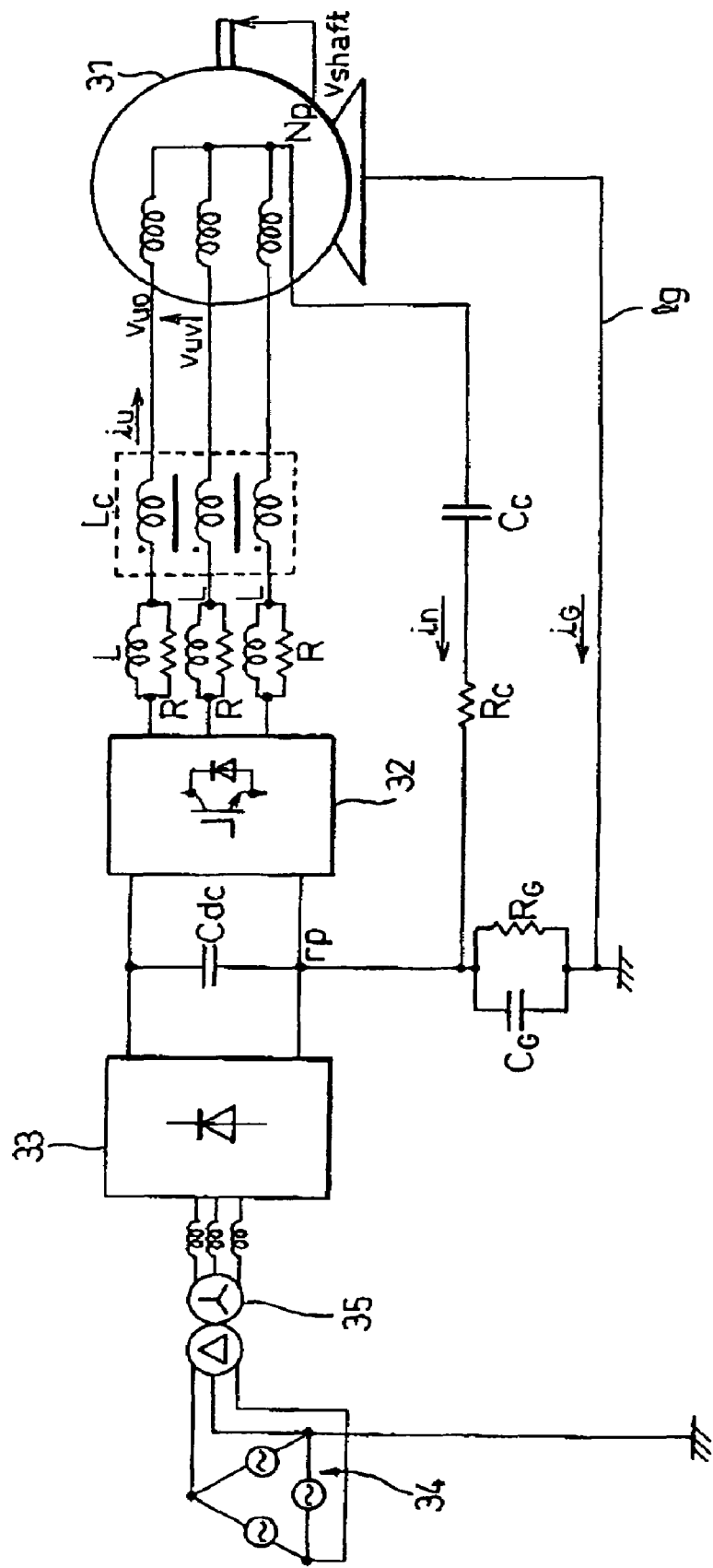
FIG. 6 is a circuit diagram of a filter device according to a second embodiment of the present invention.
Figure 7:
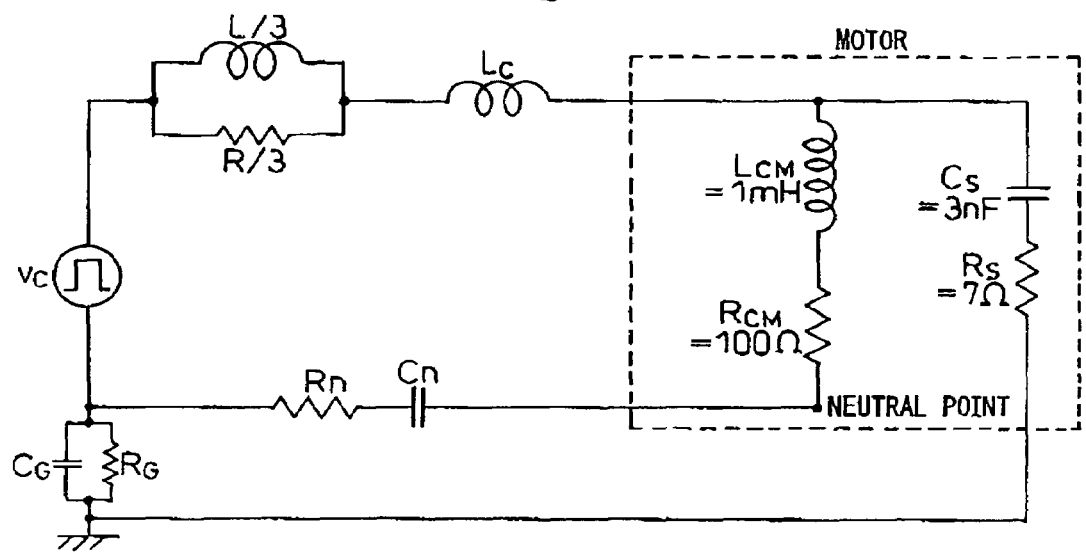
FIG. 7 is an equivalent circuit diagram of the filter device according to the second embodiment of the present invention, and shows an equivalent circuit in a carrier frequency area in a common mode shown in FIG. 6.

FIG. 6 is a circuit diagram of the filter device according to the second embodiment of the present invention. FIG. 7 is an equivalent circuit diagram of the filter device according to the second embodiment of the present invention, and shows an equivalent circuit in a carrier frequency area in a common mode shown in FIG. 6.

The present embodiment corresponds to the embodiment according to the first aspect of the present invention. In the first embodiment shown in FIG. 3, a normal mode filter configured by a parallel circuit of a normal mode choke (that is, an alternating current reactor) L and a resistor R is further connected in series between the inverter 32 and the common mode reactor, with a view to decreasing resonance in a megahertz area. Other circuit configurations are similar to those of the first embodiment.

Based on the same idea of the equivalent circuit explained in the first embodiment, the filter circuit shown in FIG. 6 can be expressed as an equivalent circuit as shown in FIG. 7 in the carrier frequency area. In the carrier frequency area, the normal mode field that is configured by the normal mode choke L and the resistor R operates as the reactor L. Because this reactor L is sufficiently smaller than the common mode choke $L_C$, the normal mode filter can be disregarded. Based on this fact, the equivalent circuit shown in FIG. 7 can be further simplified as the LCR series circuit as shown in FIG. 5 (b), like in the first embodiment. Therefore, the amplitude ratio of the common mode voltage $V_{CM}$ at input terminals of the induction motor to the common mode voltage $V_C$ at the alternating current output terminals of the inverter, $V_{CM}/V_C$, becomes the same as that according to the first embodiment explained above. In other words, in the present embodiment, the shaft voltage $V_{shaft}$ and the leak current $i_G$ of the induction motor 31 can be also suppressed.

As explained above, according to the second embodiment of the present invention, electromagnetic interference can be suppressed.

Next, a filter device that is applied when the power converter explained with reference to FIG. 1 is a converter with an alternating current input and an alternating current output is explained as a third embodiment of the present invention.

Figure 8:
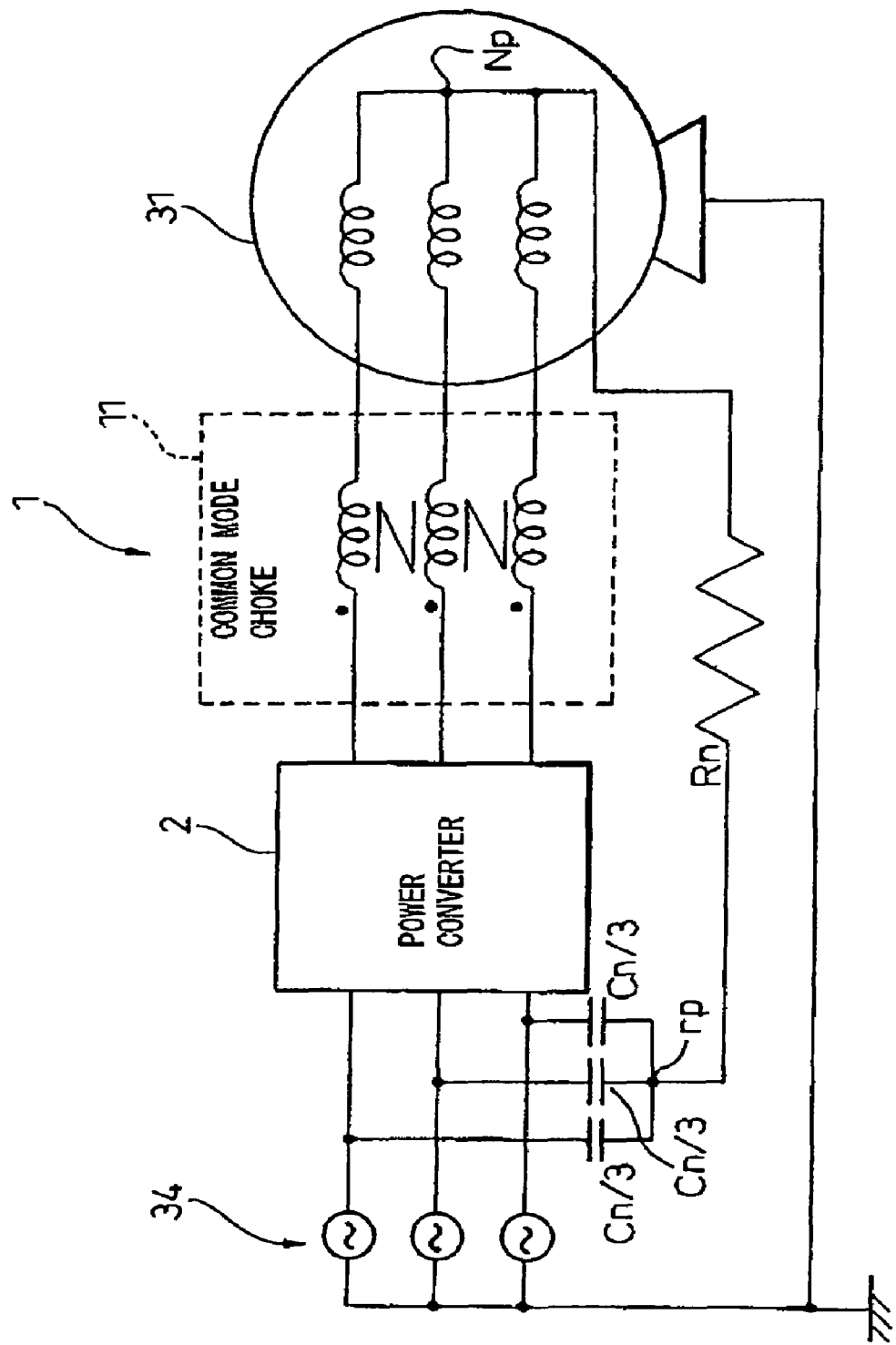
FIG. 8 is a circuit diagram (part 1) of a filter device according to a third embodiment of the present invention, where a point having little voltage variation that becomes a reference potential point is not present at an input side of a power converter.
Figure 9:
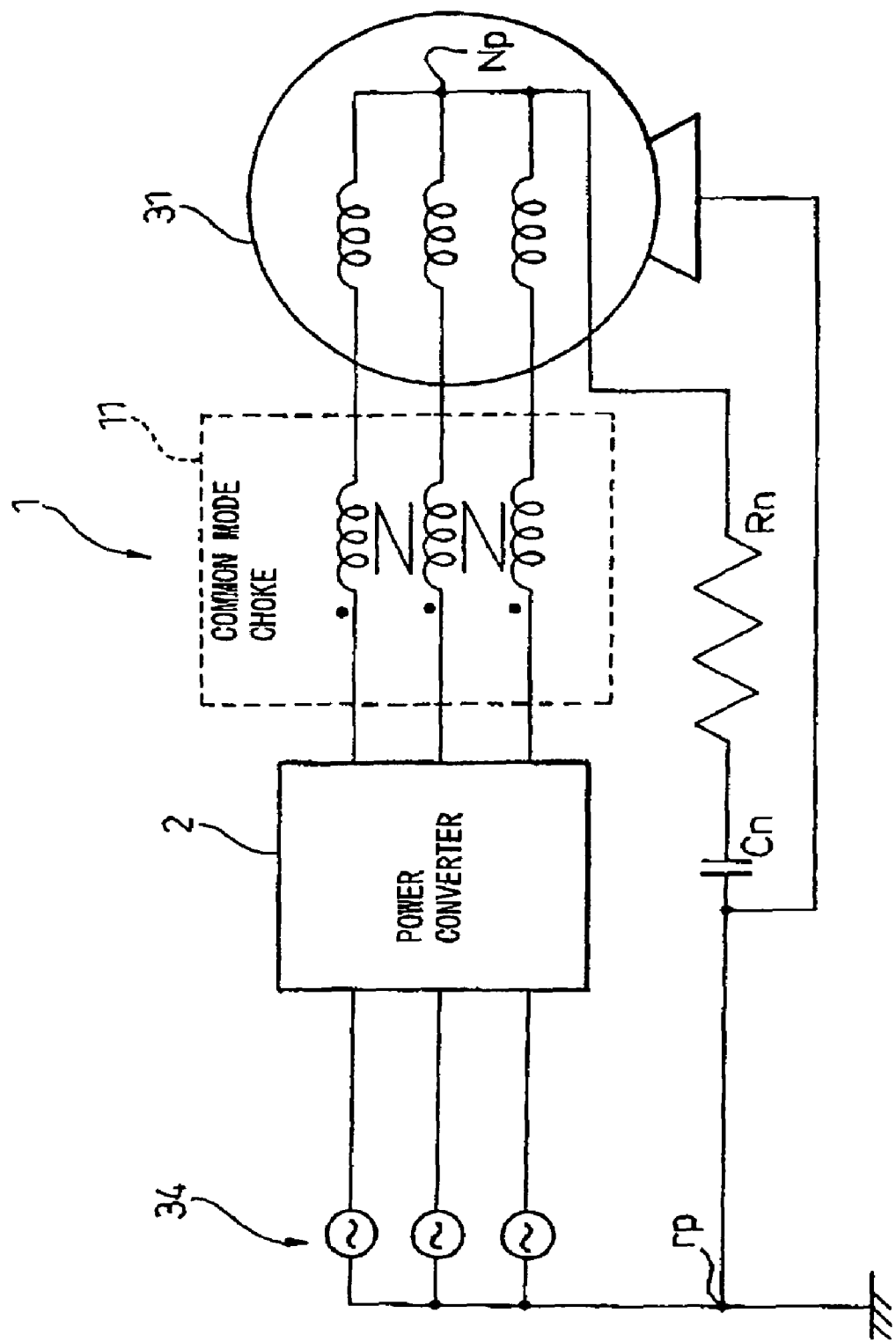
FIG. 9 is a circuit diagram (part 2) of a filter device according to the third embodiment of the present invention, where a point having little voltage variation that becomes a reference potential point is present at the input side of the power converter.

FIG. 8 is a circuit diagram (part 1) of a filter device according to the third embodiment of the present invention, where a point having little voltage variation that becomes a reference potential point is not present at the input side of the power converter. FIG. 9 is a circuit diagram (part 2) of a filter device according to the third embodiment of the present invention, where a point having little voltage variation that becomes a reference potential point is present at the input side of the power converter.

Figure 10:
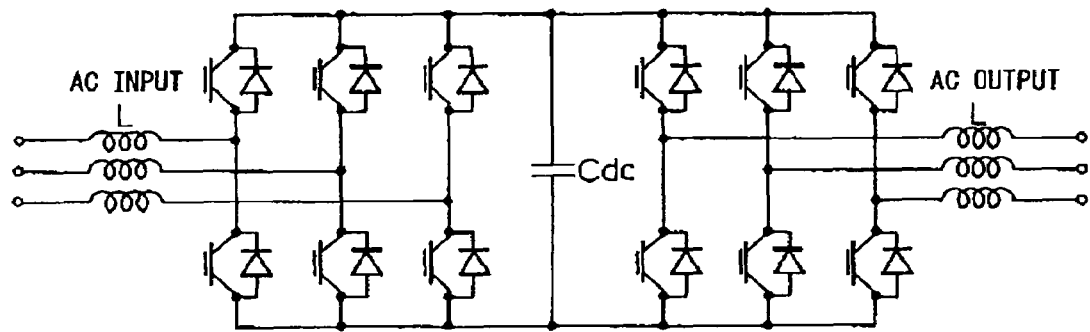
FIG. 10 is a circuit diagram of a voltage type PWM converter-inverter.
Figure 11:
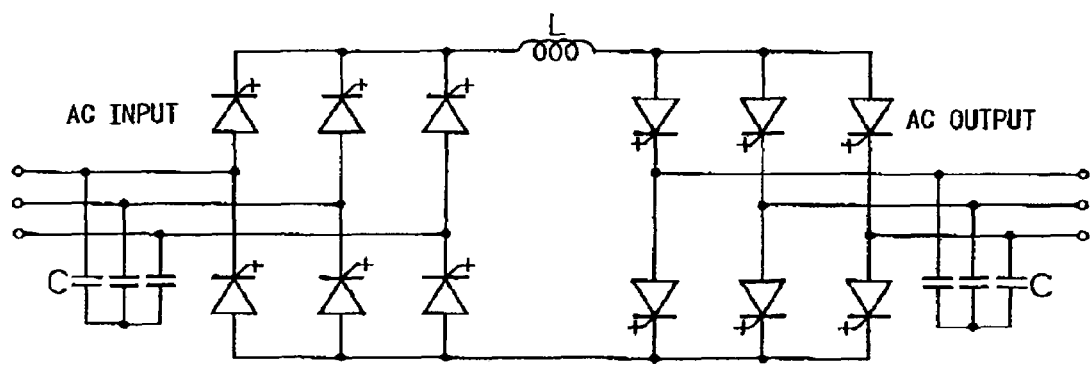
FIG. 11 is a circuit diagram of a current type PWM converter-inverter.

The present embodiment corresponds to the embodiment according to the first aspect of the present invention. In the filter device 1, the power converter 2 shown in FIG. 8 and FIG. 9 is used as the converter with an alternating current input and an alternating current output, and the three-phase induction motor 31 is inverter driven by the power converter 2. The power converter 2 can be a conventional converter with an alternating current input and an alternating current output, or can be an alternating current-direct current-alternating current converter (i.e., an AC-DC-AC converter), or a matrix converter that directly converts an alternating current into an alternating current. For example, a converter shown in FIG. 10 to FIG. 12 is available as the converter corresponding to the power converter 2 shown in FIG. 8 and FIG. 9. The converter can be other than this converter, such as a converter with an alternating current input and an alternating current output. FIG. 10 is a circuit diagram of a voltage-source PWM converter-inverter. FIG. 11 is a circuit diagram of a current-source PWM converter-inverter. FIGS. 12 (a) to (e) are circuit diagrams of a matrix converter. In the matrix converter shown in FIG. 12 (a), a switch 41 as shown in FIG. 12 (b) is general switch means constituted by diodes and transistors as shown in FIGS. 12 (c) to (e).

In the filter device 1 according to the third embodiment of the present invention shown in FIG. 8 and FIG. 9, the common mode choke 11 is connected to between the alternating current output terminals of the converter 2 and the input terminals of the induction motor, as already explained in the first embodiment.

On the other hand, the outgoing line from the neutral point Np of the induction motor 31 is connected to the reference potential point rp via the capacitor Cn and the resistor Rn. However, the filter device shown in FIG. 8 and the filter device shown in FIG. 9 take a reference potential point in mutually different manners.

The configuration shown in FIG. 8 is effective when a point having little voltage variation, and that becomes the reference potential point, is not present at the power source system side or the alternating current input side of the power converter 2. The neutral point is configured by connecting the resistors Cn/3 in parallel to respective phases of the alternating current input terminals of the converter 2, and this neutral point is used as the reference potential point rp.

On the other hand, FIG. 9 shows that a point having little voltage variation is present. For example, when the system side is grounded at the neutral point of the Y-connection of the transformer, this configuration corresponds to this case. Because this neutral point is one of points having little voltage variation, the neutral point can be the reference potential point rp, in the case of the configuration as shown in FIG. 9. The ground line from the induction motor 31 can be connected to the outgoing line from the neutral point Np of the induction motor 31 within a casing (not shown) that contains the induction motor 31, and then can be connected to the reference potential point.

As explained above, according to the third embodiment of the present invention, the filter device can be applied to suppress electromagnetic interference of the induction motor driven by various kinds of alternating current input and alternating current output converter. In this case, when the neutral point is present at the alternating current input side, this point is used as a reference potential point. When a point having little voltage variation is not present at the power source system side or the alternating current input side of the power converter 2, the neutral point is created, and this point is used as the reference potential point. With this arrangement, the filter device can be easily applied to suppress electromagnetic interference.

As a fourth embodiment of the present invention, the application of the present invention to suppress electromagnetic interference in the motor control according to a method attracting attention in recent years is explained next.

Figure 13:
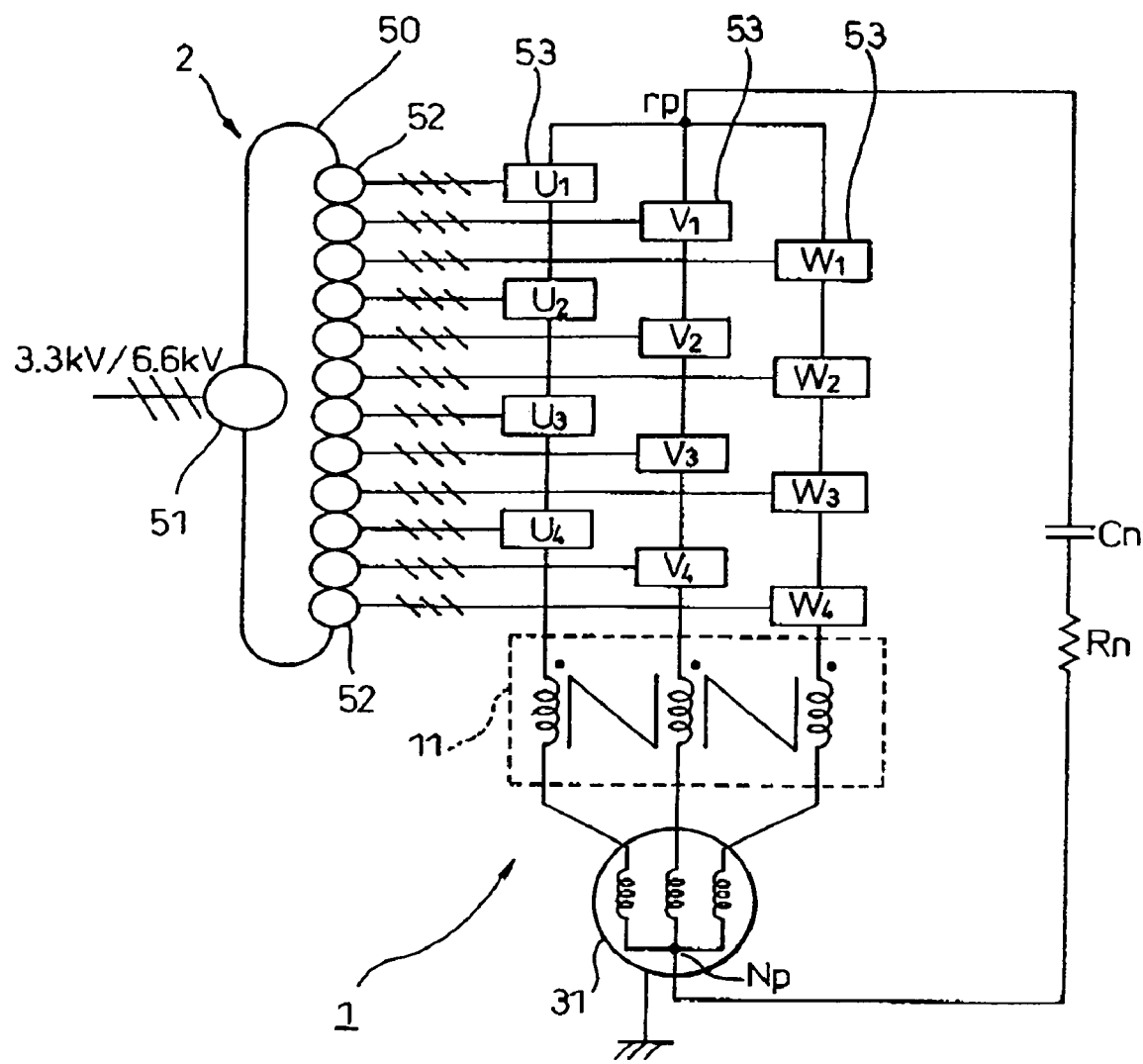
FIG. 13 is a circuit diagram of a filter device according to a fourth embodiment of the present invention.
Figure 14:
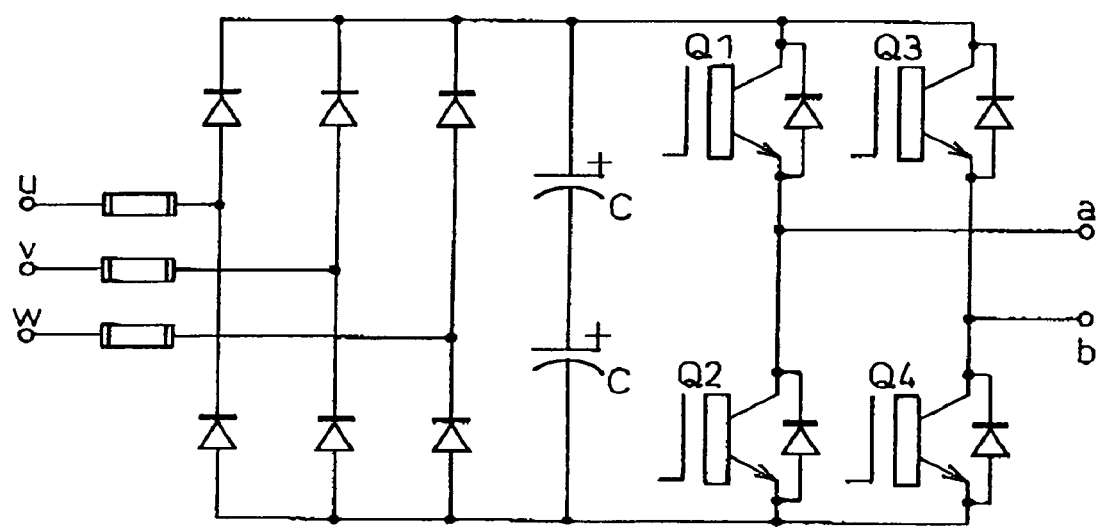
FIG. 14 is a circuit diagram of converter inverter units provided in a high-voltage converter in the filter device according to the fourth embodiment of the present invention.

FIG. 13 is a circuit diagram of a filter device according to the fourth embodiment of the present invention. FIG. 14 is a circuit diagram of converter inverter units provided in a high-voltage converter in the filter device according to the fourth embodiment of the present invention.

In the present embodiment, the present invention is applied to the motor control using a multi-winding transformer. The motor control using a high-voltage converter having the multi-winding transformer is explained in detail in "A new approach to enhance power quality for medium voltage AC drivers", by P. W. Hammond, 1997, IEEE Transaction on Industry Applications, Vo. 133, No. 1, pp. 202-208. Therefore, a circuit configuration of the high-voltage converter having the multi-winding transformer is briefly explained in the present specification.

In FIG. 13, a multi-winding transformer 50 within a high-voltage converter 2 has one primary winding 51, and plural winding sets 52 as secondary windings. The input of the primary winding 51 and the output of each winding set 52 at the secondary side are three-phase alternating currents. A three-phase output of each winding unit 52 is connected to each input of converter inverter units 53 ($U_1$, $U_2$, $U_3$, $U_4$, $V_1$, $V_2$, $V_3$, $V_4$, $W_1$, $W_2$, $W_3$, $W_4$).

FIG. 14 shows a circuit configuration of the converter-inverter unit 53. Each converter-inverter unit 53 has such a configuration that a converter and an inverter are connected together via a DC link having a capacitor C. The input to the converter inverter unit 53 is a three-phase alternating current (u phase, v phase, and w phase), and the output from this unit is a two-phase alternating current (a phase, b phase).

According to the high-voltage converter 2 shown in FIG. 13, the outputs of the converter inverter units 53 are connected in cascade to each phase corresponding to the three phases of the induction motor 31 as shown in FIG. 13.

One of the three-phase output terminals of the high-voltage converter 2 is connected and configured as the neutral point, and a three-phase load circuit such as an induction motor is connected to the other three-phase output terminals.

The present invention is applied to the high-voltage converter having the above circuit configuration, as follows.

According to the present embodiment, as shown in FIG. 13, the common mode choke 11 is connected between output terminals of the high-voltage converter 2 and the input terminals of the induction motor 31. Because the neutral point is already configured in the other output terminals of the high-voltage converter 2, this neutral point is used as the reference potential point rp in the present embodiment. The neutral point Np of the induction motor 31 is connected to the reference potential point rp via the capacitor Cn and the resistor Rn. When the above circuit is configured, the present invention can be also applied to the motor control by the converter having the multi-winding transformer.

Next, a filter device that suppresses electromagnetic interference of the alternating current circuit connected to the power converter with an alternating current input and an alternating current output, of which outline is as explained with reference to FIG. 2, is explained as a fifth embodiment of the present invention.

Figure 15:
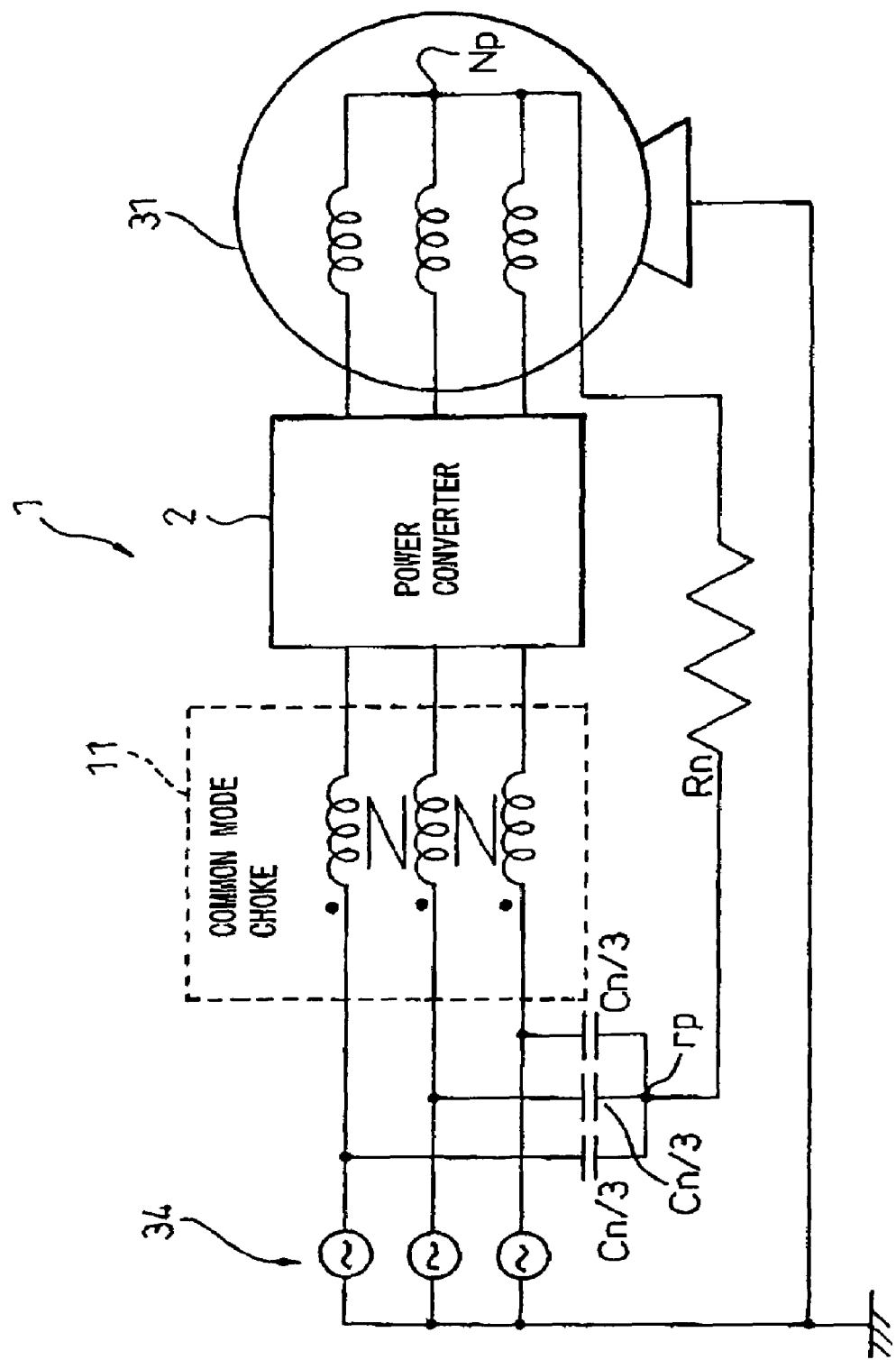
FIG. 15 is a circuit diagram (part 1) of a filter device according to a fifth embodiment of the present invention, where a point having little voltage variation that becomes a reference potential point is not present at a power source system side of a power converter.
Figure 16:
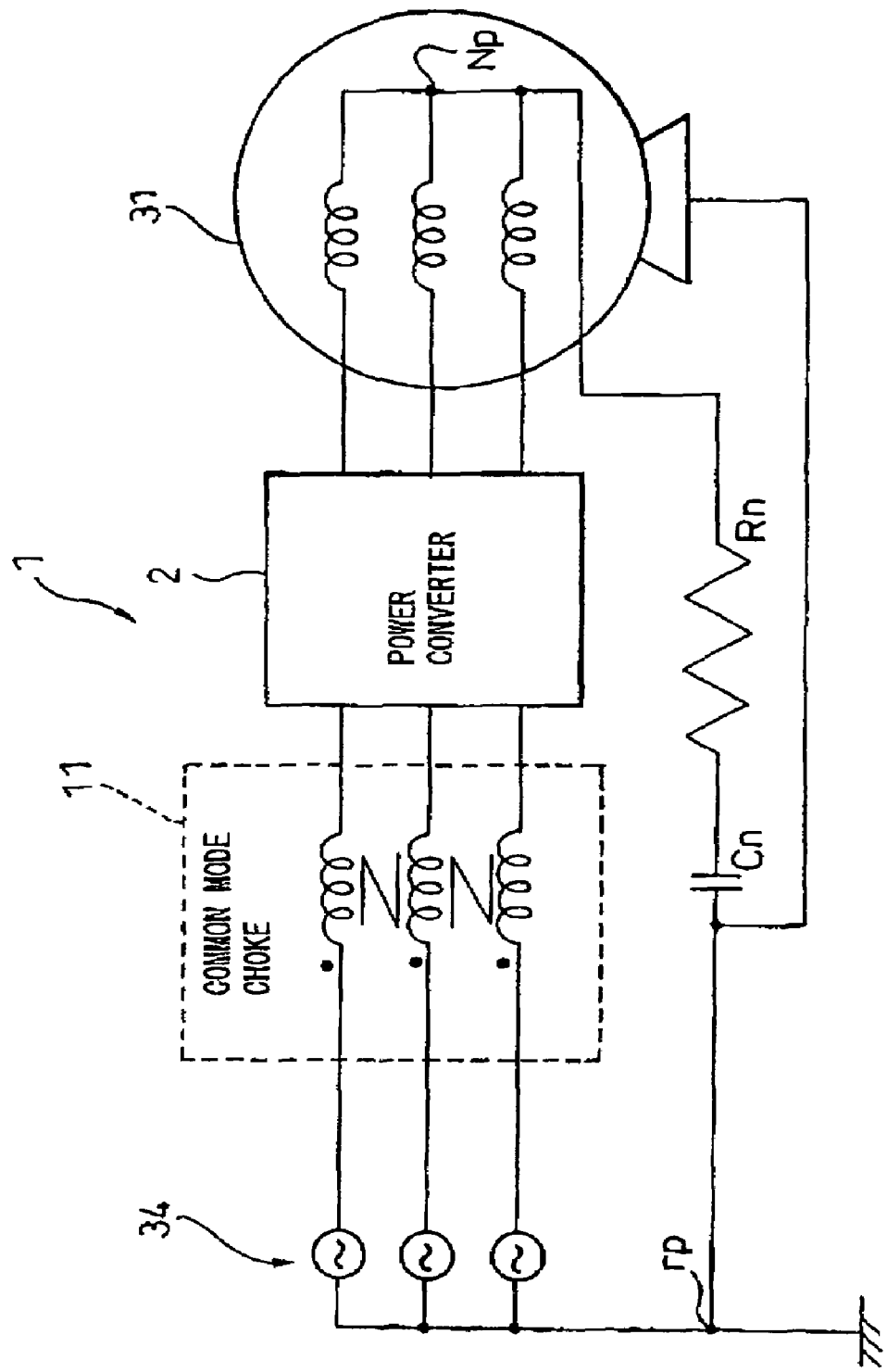
FIG. 16 is a circuit diagram (part 2) of a filter device according to the fifth embodiment of the present invention, where a point having little voltage variation that becomes a reference potential point is not present at the power source system side of the power converter.

FIG. 15 is a circuit diagram (part 1) of the filter device according to the fifth embodiment of the present invention, where a point having little voltage variation that becomes a reference potential point is not present at the power source system side of the power converter. FIG. 16 is a circuit diagram (part 2) of the filter device according to the fifth embodiment of the present invention, where a point having little voltage variation that becomes a reference potential point is not present at the power source system side of the power converter.

According to the filter device 1 of the present embodiment, the power converter 2 shown in FIG. 15 and FIG. 16 is a converter with an alternating current input and an alternating current output, and the three-phase induction motor 31 is driven by the power converter 2. The power converter 2 can be the conventional converter with an alternating input and an alternating output, or can be an alternating current-direct current-alternating current converter (i.e., an AC-DC-AC converter), or a matrix converter that directly converts an alternating current into an alternating current. For example, a converter as shown in FIG. 9 to FIG. 11 is available as the converter corresponding to the power converter 2 shown in FIG. 15 and FIG. 16. It should be noted that, according to the present embodiment, the power converter 2 does not include the case that the alternating current-direct current converter (AC-DC converter, that is, a rectifier) is a diode rectifier.

In the filter device 1 according to the fifth embodiment of the present invention shown in FIG. 15 and FIG. 16, the common mode choke 11 is connected to the alternating current input terminal side of the power converter 2.

On the other hand, the outgoing line from the neutral point Np of the induction motor 31 is connected to the reference potential point rp via the capacitor Cn and the resistor Rn. However, the filter device shown in FIG. 15 and the filter device shown in FIG. 16 take a reference potential point in mutually different ways.

The configuration shown in FIG. 15 is effective when a point having little voltage variation that becomes the reference potential point is not present at the power source system side of the common mode choke 11. The neutral point is configured by connecting the capacitors Cn/3 in parallel to the power source system side of the common mode choke 11, and this neutral point is used as the reference potential point rp.

On the other hand, FIG. 16 shows that a point having little voltage variation is present. For example, when the system side is grounded at the neutral point of the Y-connection of the transformer, this configuration corresponds to this case. Because this neutral point is one of points having little voltage variation, the neutral point can be the reference potential point rp, in the case of the configuration as shown in FIG. 16. The ground line from the induction motor 31 can be connected to the outgoing line from the neutral point Np of the induction motor 31 within a casing (not shown) that contains the induction motor 31, and then can be connected to the reference potential point.

Electromagnetic interference can be suppressed by the filter device according to the fifth embodiment of the present invention.

The filter device according to the fifth embodiment can be also applied to the motor control by the high-voltage converter having the multi-winding transformer explained in the fourth embodiment with reference to FIG. 13 and FIG. 14.

In this case, in the configuration of the fourth embodiment shown in FIG. 12, the common mode choke 11 connected between output terminals of the high-voltage converter 2 and the input terminals of the induction motor 31 can be connected to between the reference potential point rp and the converter inverter unit 53 nearest to the reference potential point rp respectively.

The filter device according to the second aspect of the present invention is explained next.

Figure 17:
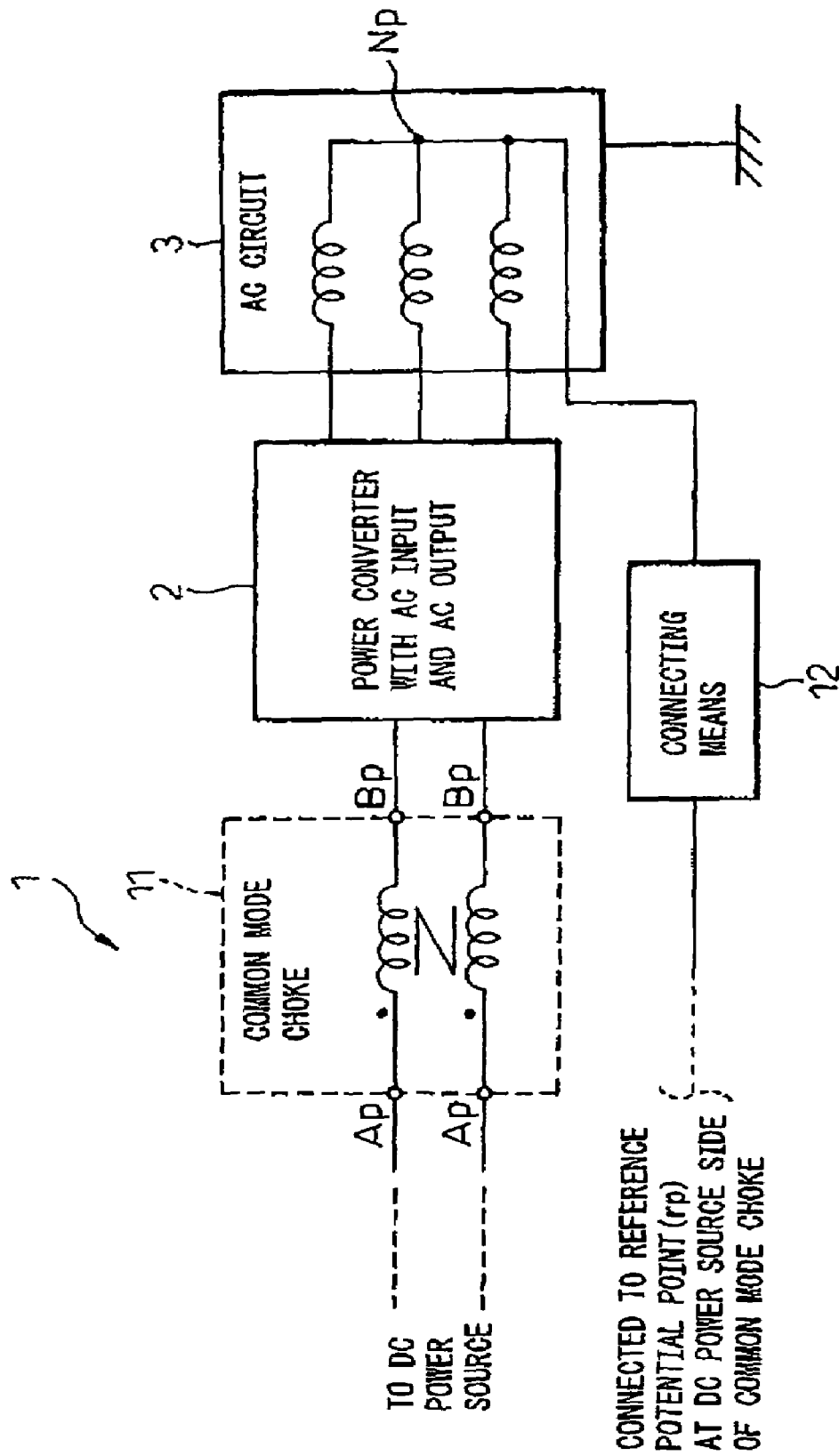
FIG. 17 is a system configuration diagram of a filter device according to a second aspect of the present invention.

FIG. 17 is a system configuration diagram of the filter device according to the second aspect of the present invention.

The filter device 1 that suppresses electromagnetic interference generated in the alternating current circuit 3 connected to the power converter 2 (that is, the inverter) of a direct current input and an alternating current input includes the common mode choke 11 connected to the direct current input terminals Bp of the power converter 2 connected to the input terminals of the alternating current circuit 3, and the connecting means 12 that connects the outgoing line from the neutral point Np of the alternating current circuit 3 to the reference potential point rp having little potential variation present at the direct current power source side of the common mode choke 11.

The connecting means 12 preferably includes a capacitor and a resistor (not shown) that are connected in series, as in the first aspect of the invention.

The reference potential point rp can be any one point having little potential variation at the direct current power source side of the common mode choke 11, that is, at the upstream of the common mode choke 11.

For example, any one of a plus potential point, a minus potential point, and the neutral potential point if possible, at the direct current input side of the power converter 2 can be the reference potential point. For example, when a power converter is a neutral-point-clamp inverter, any one of a plus potential point, a minus potential point, and the neutral point at the direct current input side of the neutral-point-clamp inverter can be the reference potential point.

According to the second aspect of the present invention, there is formed a closed loop from the neutral point Np of the alternating current circuit 3 to the reference potential point rp at the power source system side of the power converter 2. Based on this configuration, the common mode choke 11 operates effectively. In other words, most of the common mode voltage that is generated from the power converter 2 is applied to both ends of the common mode choke 11, and no common mode voltage is generated at the input terminals of the alternating current circuit 3. Consequently, a shaft voltage, a bearing current, and a leak current attributable to the common mode voltage are effectively suppressed. The filter device according to the present invention has a higher effect of suppressing electromagnetic interference than that the devices according to the conventional techniques.

Figure 18:
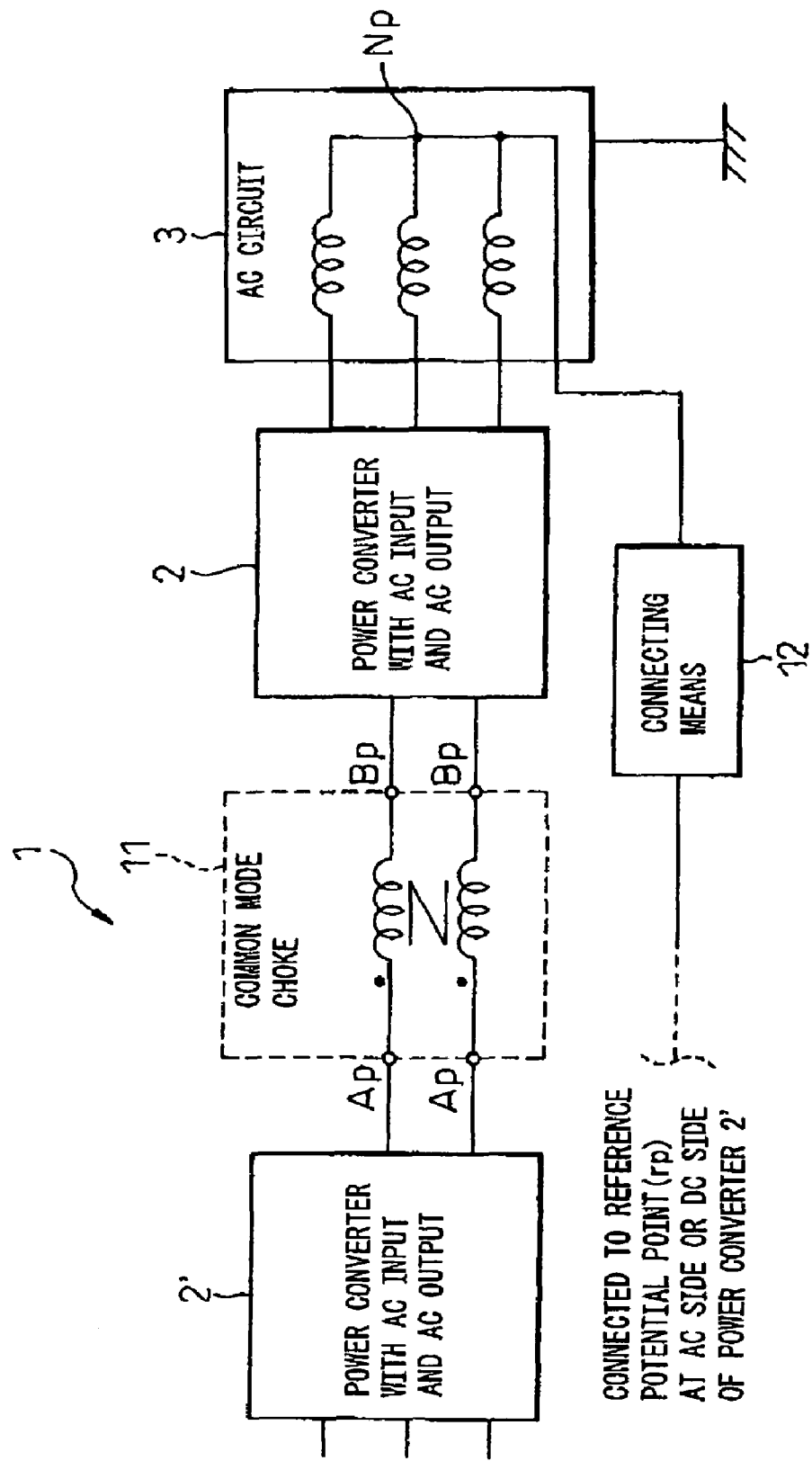
FIG. 18 is a system configuration diagram of a filter device according to a modification of the second aspect of the present invention.

FIG. 18 is a system configuration diagram of a filter device according to a modification of the second aspect of the present invention.

The filter device 1 that suppresses electromagnetic interference generated in the alternating current circuit 3 is connected to a power converter system including a power converter 2' with an alternating current input and a direct current output and the power converter 2. This filter device 1 includes the common mode choke 11 that is connected to between the direct current output terminals Ap of the power converter 21 with the alternating current input and the direct current output and the direct current input terminals Bp of the power converter 2 with the direct current input and the alternating current output, and the connecting means 12 that connects the outgoing line from the neutral point Np of the alternating current circuit 3 to the reference potential point rp having little potential variation at the alternating current input terminal side or the direct current input terminal side Bp of the power converter 2' with the alternating current input and the direct current output.

The connecting means 12 preferably includes a capacitor and a resistor (not shown) that are connected in series, as in the first aspect.

The reference potential point rp can be at any point having little potential variation, at the alternating current input terminal side or the direct current input terminal Bp side of the power converter 2' with the alternating current input and the direct current output.

According to the modification of the second aspect of the present invention, the filter device has a closed loop formed from the neutral point Np of the alternating current circuit 3 to the reference potential point rp at the upstream of the common mode choke 11 connected to the direct current input terminal side Bp of the power converter 2. With this arrangement, there is an effect that the common mode choke 11 operates effectively, and has effects similar to those of the filter device shown in FIG. 1.

Figure 19:
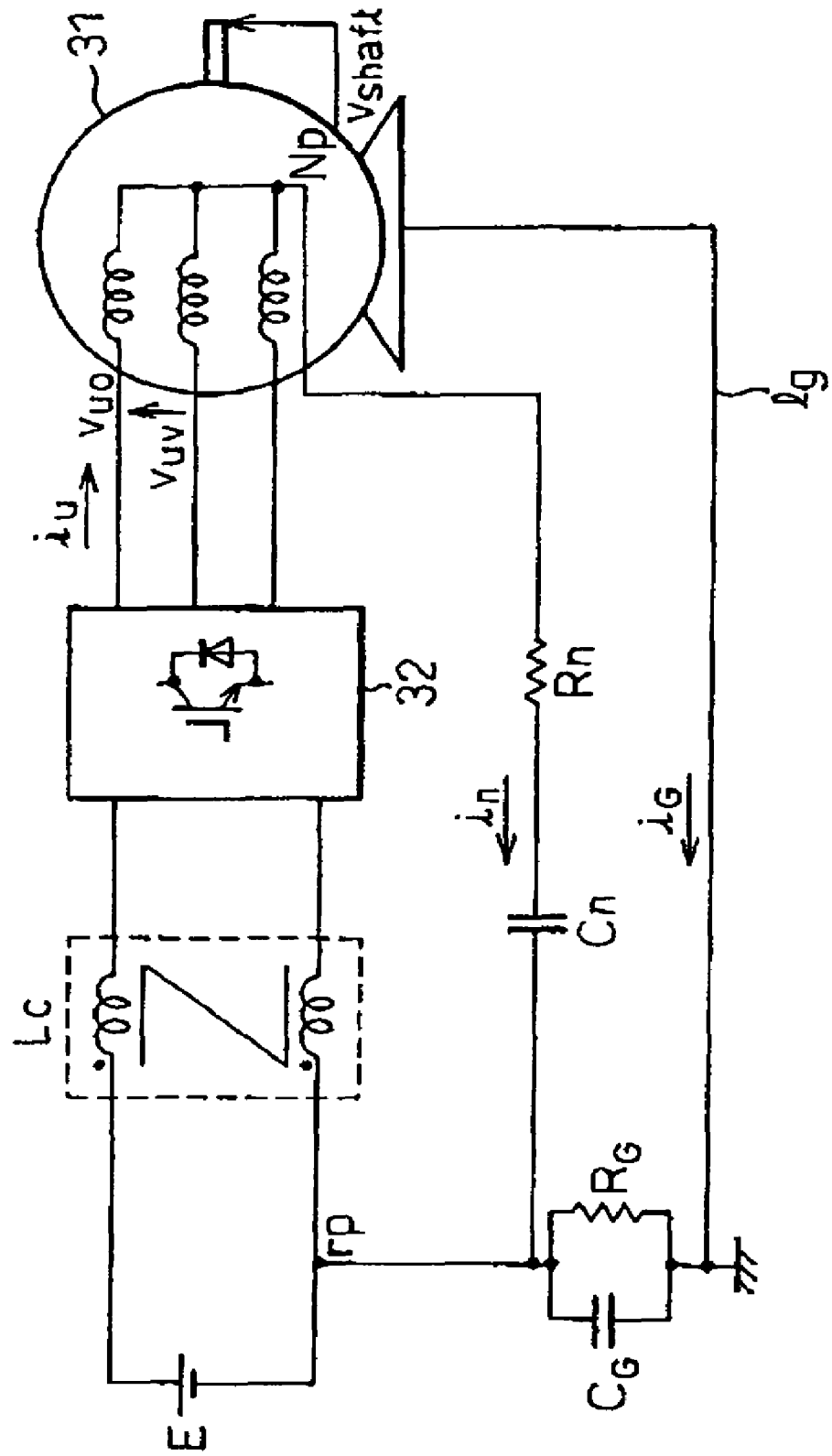
FIG. 19 is a circuit diagram of a filter device according to a sixth embodiment of the present invention.

FIG. 19 is a circuit diagram of a filter device according to a sixth embodiment of the present invention.

The present embodiment corresponds to the embodiment according to the second aspect of the present invention shown in FIG. 17. In the present embodiment, the alternating current circuit is the three-phase induction motor 31. The power converter with the direct current input and the alternating current output is the inverter 32. The induction motor 31 is driven by the inverter with a direct current power source E such as a battery via the inverter 32. In FIG. 17, the ground line lg of the frame of the induction motor 31 is also shown.

In order to ground the minus terminal at the direct current input side of the inverter 32, the capacitor $C_G$ and the resistor $R_G$ that are connected in parallel are provided. The capacitor $C_G$ operates as a capacitor grounding for a high frequency component, and the resistor $R_G$ operates as a resistor grounding for a low frequency component.

The common mode choke $L_C$ is connected to the direct current input terminal side of the inverter 32. According to the present embodiment, the common mode choke $L_C$ is installed in the direct current line, and has two conductors wound up in the same direction. In other words, according to the present embodiment, the device can be made more compact and can be provided at a lower cost than the device using the common mode choke made of three conductors wound up in the same direction according to the first to the fifth embodiment.

The inverter 32 is connected to the direct current power source E via the common mode choke $L_C$.

The outgoing line from the neutral point Np of the induction motor 31 is connected to the reference potential point rp via the connecting means including the capacitor Cn and the resistor Rn connected in series.

As already explained above, the reference potential point rp can be a point having little potential variation present at the direct current power source side of the common mode choke $L_C$. In the present embodiment, while the reference potential point rp is the minus potential point of the direct current power source E, the reference potential point rp can be the plus potential point of the direct current power source E.

Ideally, the fundamental current that flows from the neutral point Np of the induction motor 31 is zero, and therefore, the outgoing line from the neutral point Np of the induction motor 31 can be directly connected to the reference potential point rp. However, actually, the fundamental current flows out. Therefore, according to the present embodiment, the capacitor Cn is provided to prevent this fundamental current from flowing. The provision of the capacitor Cn entails a risk that resonance is generated depending on a condition of other parameter. Therefore, the resistor Rn is further provided as a damping resistor to suppress this resonance.

Figure 20:
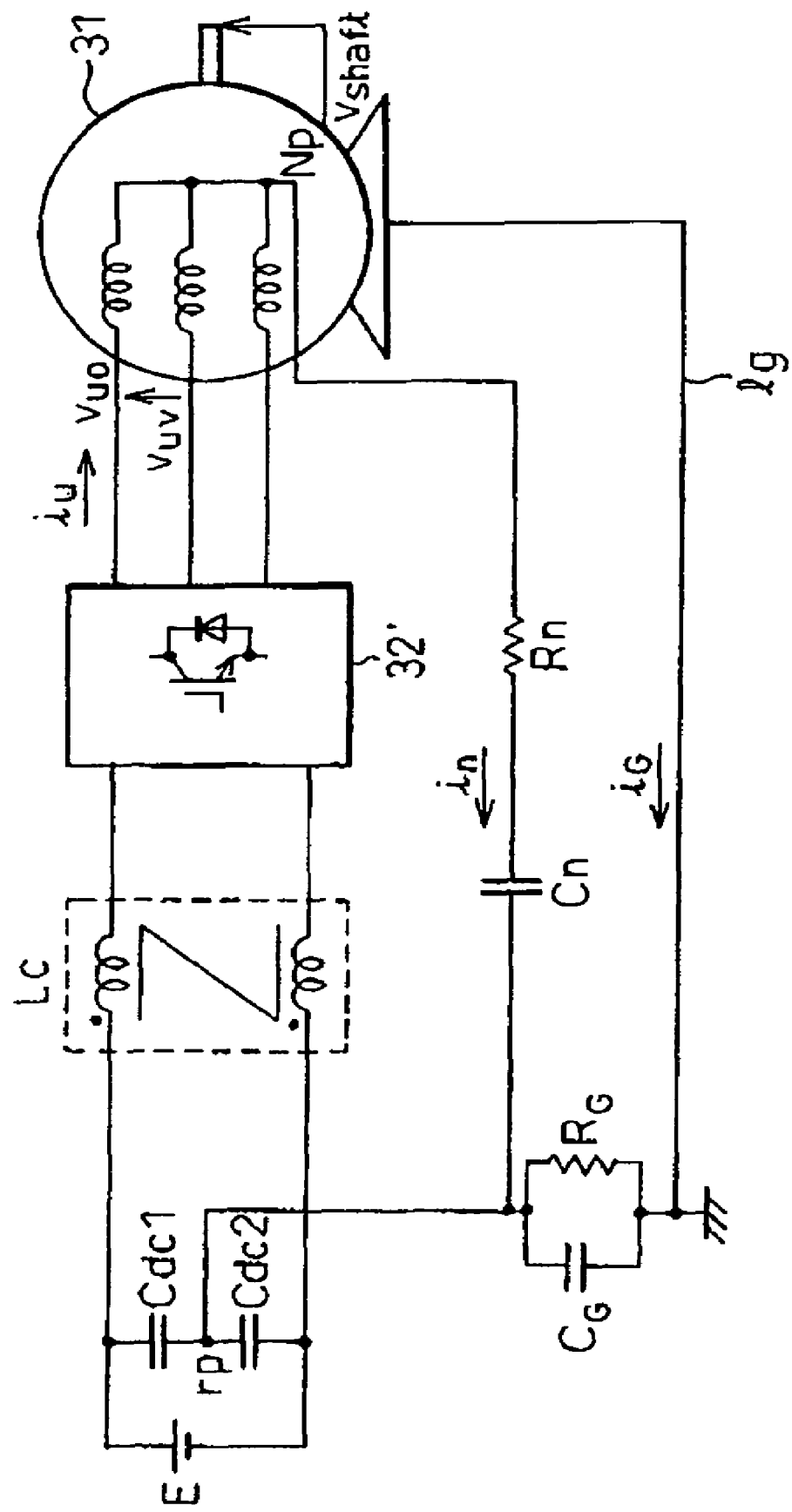
FIG. 20 is a circuit diagram of a filter device according to a modification of the sixth embodiment of the present invention.

FIG. 20 is a circuit diagram of a filter device according to a modification of the sixth embodiment of the present invention.

According to the present modification, the reference potential point rp is a clamp point of the direct current capacitors Cdc1 and Cdc2.

When a direct current power source has a large capacity, plural direct current capacitors are connected in series because of a withstand voltage of the capacitors, and any one of a plus potential point, a minus potential point, and a point where the potential is stable between series-connected direct current capacitors at the direct current input side of the direct current power source can be the reference potential point.

Figure 21:
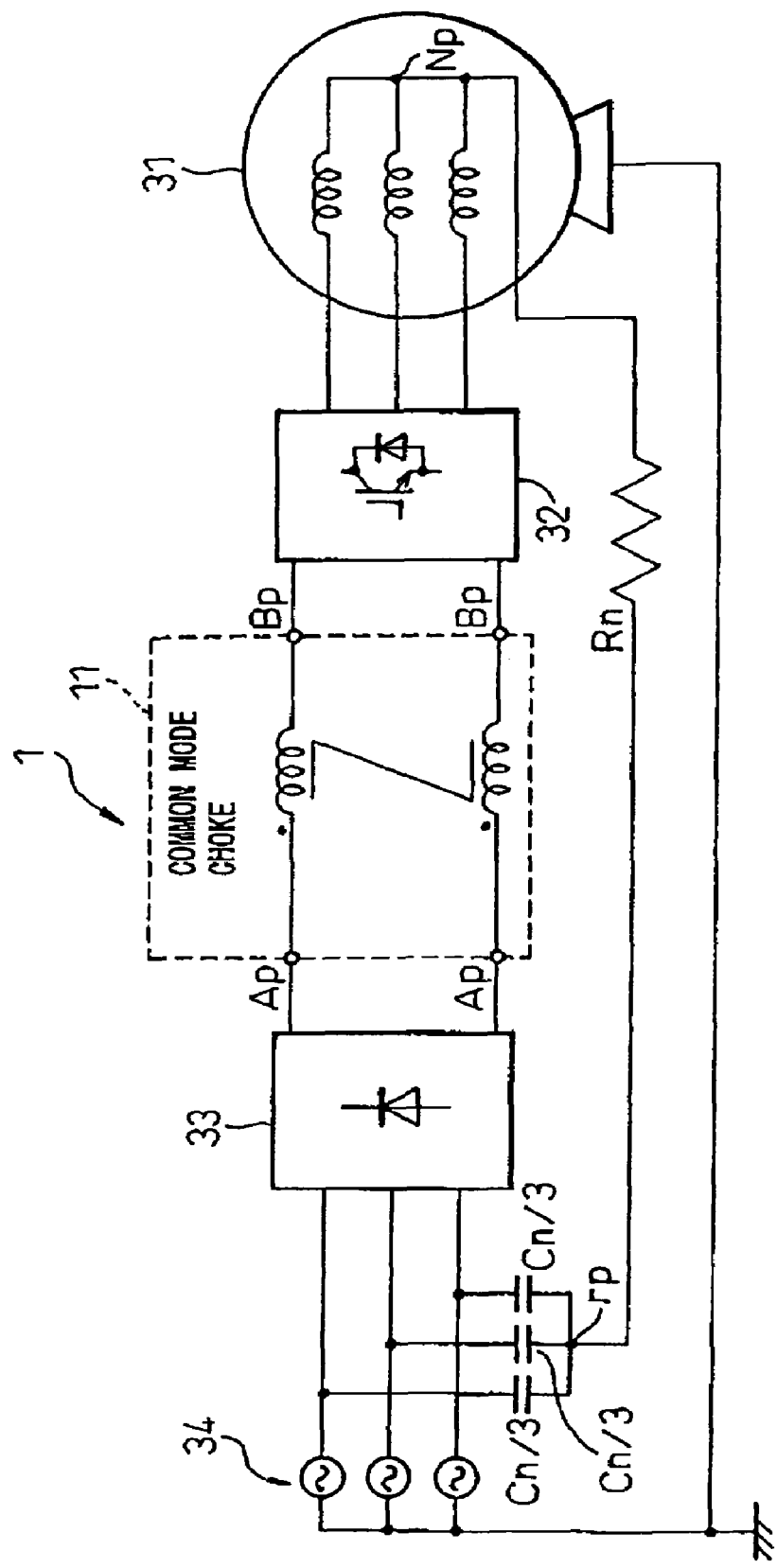
FIG. 21 is a circuit diagram of a filter device according to a seventh embodiment of the present invention.

FIG. 21 is a circuit diagram of a filter device according to a seventh embodiment of the present invention.

The present embodiment corresponds to the embodiment of the modification of the second aspect of the present invention shown in FIG. 18.

In the present embodiment, the alternating current circuit is the three-phase induction motor 31. The power converter with the direct current input and the alternating current output is the inverter 32. The power converter with the alternating current input and the direct current output is the converter 33. The three-phase induction motor 31 is driven by a power converter system including the inverter 32 and the converter 33. The inverter 32 and the converter 33 are as explained with reference to FIG. 10 to FIG. 12.

In the filter device 1 according to the seventh embodiment of the present invention shown in FIG. 21, the common mode choke 11 is connected between the direct current output terminals Ap of the converter 33 and the direct current input terminals Bp of the inverter 32. The common mode choke 11 according to the present embodiment is installed in the direct current line, as in the sixth embodiment and, therefore, has two conductors wound in the same direction. In other words, according to the present embodiment, the device can be made more compact and can be provided at a lower cost than the device using the common mode choke made of three conductors wound in the same direction according to the first to the fifth embodiment.

The outgoing line from the neutral point Np of the induction motor 31 is connected to the reference potential point rp via the capacitor Cn and the resistor Rn.

According to the present embodiment, the neutral point is configured by connecting the resistors Cn/3 in parallel to respective phases of the alternating current input terminals of the converter 2, and this neutral point is set as the reference potential point rp. This method is effective when a point having little voltage variation, and that can become the reference potential point, is not present at the power source system side or the alternating current input side of the power converter 2.

As explained above, according to the seventh embodiment of the present invention, the filter device can be also applied to suppress electromagnetic interference of the induction motor that is driven by the power converter system as is the inverter-converter system.

When a point having little voltage variation is not present at the power source system side or the alternating current input side of the motor converter, a neutral point as shown in FIG. 20 is created, and this neutral point can be used as the reference potential point. With this arrangement, the filter device can be easily applied to suppress electromagnetic interference. In the present embodiment, the reference potential point rp can be provided at the direct current output side of the converter 33. For example, the configuration explained with reference to FIG. 19 or FIG. 20 can be provided.

Figure 22:
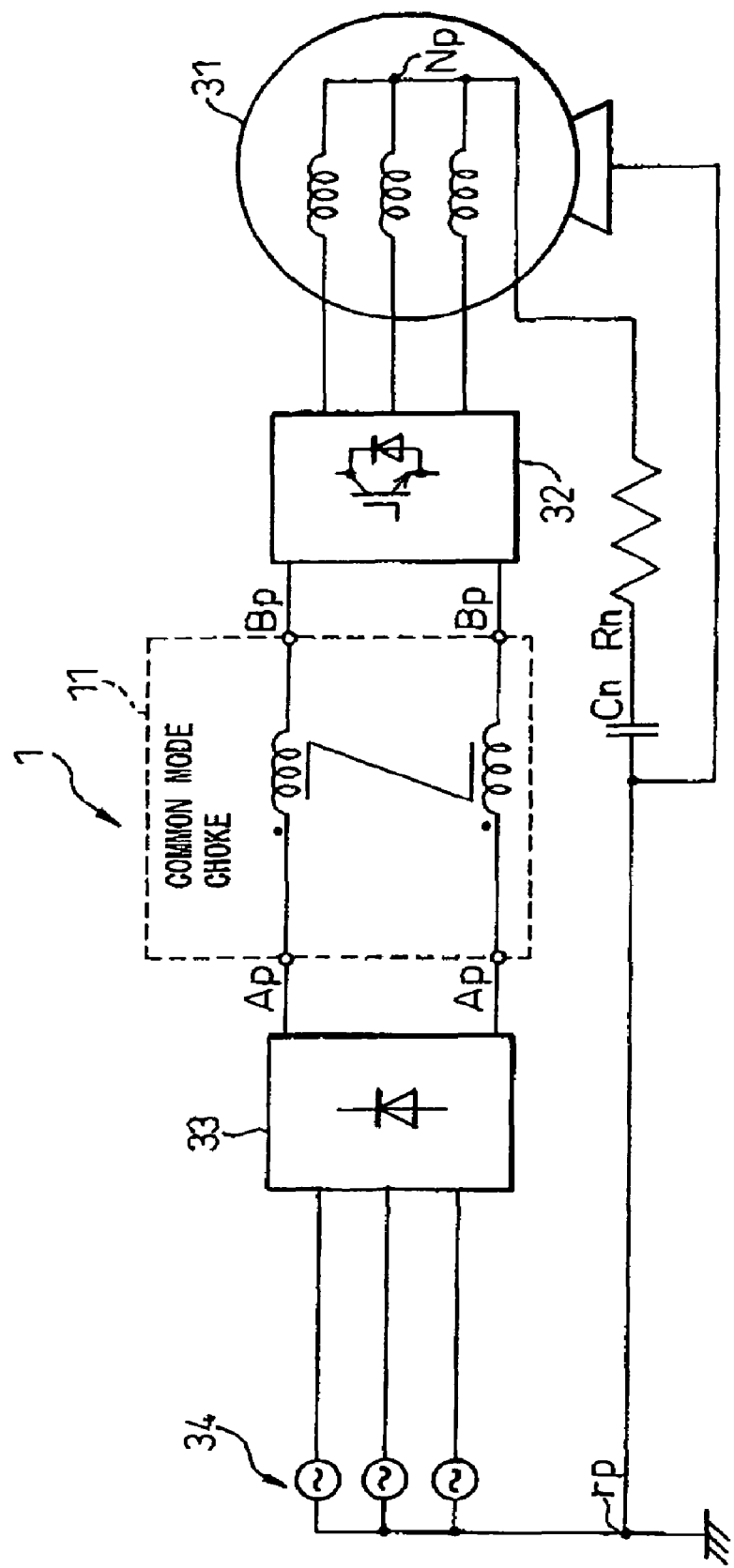
FIG. 22 is a circuit diagram of a filter device according to a modification of the seventh embodiment of the present invention.

FIG. 22 is a circuit diagram of a filter device according to a modification of the seventh embodiment of the present invention.

The present modification is a modification of the method of taking a reference potential point to which the outgoing line from the neutral point Np of the induction motor 31 is connected in the seventh embodiment explained with reference to FIG. 21. When a point having little voltage variation is present at the power source system side or the alternating current input side of the motor converter, the grounding of the system side at the neutral point of the Y-connection of the transformer corresponds to this modification.

The outgoing line from the neutral point Np of the induction motor 31 is connected to the reference potential point rp via the capacitor Cn and the resistor Rn.

In the present modification, the neutral point can be the reference potential point rp as shown in FIG. 22. The ground line from the induction motor 31 can be connected to the outgoing line from the neutral point Np of the induction motor 31 within a casing (not shown) that contains the induction motor 31, and then can be connected to the reference potential point.

As explained above, according to the modification of the seventh embodiment of the present invention, the filter device can be applied to suppress electromagnetic interference of the induction motor driven by various kinds of alternating current input and alternating current output converters. In this case, when the neutral point is present at the alternating current input side, this point is used as a reference potential point. With this arrangement, the filter device can be easily applied to suppress electromagnetic interference. In the present embodiment, the reference potential point rp can be provided at the direct current output side of the converter 33. For example, the configuration explained with reference to FIG. 19 or FIG. 20 can be provided.

In the first to the seventh embodiments, while the alternating current circuit is an induction motor, the alternating current circuit can be a synchronous motor. Alternatively, the alternating current circuit can be an electrical apparatus equipped with a converter having a Y-connection, such as a UPS (uninterruptible power supply) system, or a solar cell system, a fuel cell system, or various kinds of battery systems connected to a power supply equipped with a converter having a Y-connection.

When the synchronous motor is used, the neutral point as a starting point of the outgoing line to be connected to the reference potential point can be the neutral point within this synchronous motor, as in the above induction motor. In the case of the electrical apparatus equipped with a converter having a Y-connection, the primary side of the transformer is the Y-connection, and the secondary side is the delta connection. Based on this, the neutral point in the Y-connection at the primary side can be used.

The system voltage side is not limited to three phases, and can be two phases or a single phase. The present invention can be applied to a circuit configuration having at least a power converter that applies an alternating current output to an alternating current circuit.

INDUSTRIAL APPLICABILITY

According to the present invention, the filter device has a common mode choke and has a closed loop formed from the neutral point of the alternating current circuit to the reference potential point at the power source system side of the power converter. Based on this simple configuration, electromagnetic interference (EMI) can be effectively suppressed. Further, unlike the conventional example, the filter device according to the present invention does not require constituent elements such as a normal mode choke and transistors, and has a simple configuration. Therefore, the filter device can be compact and can be provided at low cost.

According to the present invention, the common mode choke connected between the alternating current output terminals of the power converter and the input terminal of the alternating current circuit forms a closed loop from the neutral point of the alternating current circuit to the reference potential point at the power source system side of the power converter. With this configuration, the filter circuit operates more effectively. In other words, most of the common mode voltage that is generated from the power converter is applied to both ends of the common mode choke, and no common mode voltage is generated at the input terminals of the alternating current circuit. Consequently, a shaft voltage, a bearing current, and a leak current attributable to the common mode voltage are effectively suppressed. The filter device according to the present invention has a high effect of suppressing electromagnetic interference.

The present invention does not depend on a kind of a system power source, and can be applied to a circuit configuration having at least a power converter that applies an alternating current output to an alternating current circuit. Therefore, the filter device according to the present invention can be widely applied to industrial electrical apparatuses and household electric appliances such as inverter air conditioners and inverter refrigerators.

For the power line Internet coming into practical use in future, the present invention can be effective as a filter device of both or one of a load alternating current circuit and a converter that become large noise sources.

The invention claimed is:

1. A filter device for suppressing electromagnetic interference generated in an alternating current load connected to alternating current output terminals of a power converter, the filter device comprising:
a common mode choke connected between the alternating current output terminals of the power converter and input terminals of the alternating current load; and
a capacitor and a resistor connected in series between a neutral point of the alternating current load and a reference potential point having little potential variation at a power source system side of the power converter;
wherein no midpoint between the capacitor and the resistor is grounded.

2. The filter device according to claim 1, wherein the reference potential point is the neutral point at the power source system side of the power converter.

3. The filter device according to claim 1, wherein the power converter is an inverter, and the reference potential point is any one of a plus potential point, a minus potential point, and the neutral point at a direct current input side of the inverter.

4. The filter device according to claim 1, wherein the connecting element does not extends though the common mode choke.

5. The filter device according to claim 1, wherein the alternating current load is an alternating current motor.

6. A filter device for suppressing electromagnetic interference generated in an alternating current load connected to a power converter which has an alternating current input and an alternating current output, the filter device comprising:
a common mode choke connected to the alternating current input of the power converter; and
a connecting element that connects the neutral point of the alternating current load to a reference potential point having little potential variation at a power source system side of the common mode choke;
wherein the connecting element includes a capacitor and a resistor connected in series between the neutral point of the alternating current load and the reference potential point; and
wherein the connecting element further includes a line that electrically connects the capacitor and the resistor in series, and wherein said line is not grounded.

7. The filter device according to claim 6, wherein the reference potential point is the neutral point at the power source system side of the common mode choke.

8. The filter device according to claim 6, wherein the connecting element forms no pan of the common mode choke.

9. A filter device for suppressing electromagnetic interference generated in an alternating current load connected to a power converter which has a direct current input and an alternating current output, the filter device comprising: a common mode choke connected to said direct current input of the power converter; and a connecting element that connects the neutral point of the alternating current load to a reference potential point having little potential variation at a direct current power source side of the common mode choke wherein the connecting element includes a capacitor and a resistor connected in series between the neutral point of the alternating current load and the reference potential point; and wherein the connecting element further includes a line between the capacitor and the resistor to electrically connect the capacitor and the resistor in series, and wherein said line is entirely ungrounded.

10. The filter device according to claim 9, wherein the reference potential point is any one of a plus potential point, a minus potential point, and the neutral point at a direct current input side of the power converter.

11. The filter device according to claim 9, wherein the connecting element is separated from the common mode choke.

12. A filter device for suppressing electromagnetic interference generated in an alternating current load connected to a power converter system, said power converter system including a first power converter with an alternating current input and a direct current output and a second power converter with a direct current input and an alternating current output, the filter device comprising: a common mode choke connected to and between the direct current output of the first power converter and the direct current input of the second power converter, the alternating current output of said second power converter being connected to the alternating current load; and a connecting element that connects a neutral point of the alternating current load to a reference potential point having little potential variation at an alternating current input side of the first power converter wherein the connecting element includes a capacitor and a resistor connected in series between the neutral point of the alternating current load and the reference potential point; and wherein an electrical connection between the capacitor and the resistor has no branches so that, in operation, the same current flows through both the capacitor and the resistor.

13. The filter device according to claim 12, wherein the reference potential point is the neutral point at a power source system side of the first power converter.

14. The filter device according to claim 12, wherein the connecting element is free of magnetic coupling to the common mode choke.

15. A filter device for suppressing electromagnetic interference generated in an alternating current load connected to a power converter which has an alternating current output, the filter device comprising:
   a common mode choke disposed at any one of an input side, an output side, and a direct current link of the power converter; and
   a connecting element that connects the neutral point of the alternating current load to a reference potential point upstream of the common mode choke;
   wherein the connecting element includes a capacitor and a resistor connected in series between the neutral point of the alternating current load and the reference potential point; and
   wherein the connecting element is not grounded at any point along an electrical connection between the capacitor and the resistor.

16. The filter device according to claim 15, wherein the reference potential point is a point having little voltage variation.

17. The filter device according to claim 15, wherein the reference potential point is the neutral point at a power source system side of the power converter.

18. The filter device according to claim 15, wherein the connecting element forms no part of and is located completely outside the common mode choke.

* * * * *

UNITED STATES PATENT AND TRADEMARK OFFICE
CERTIFICATE OF CORRECTION

PATENT NO. : 7,606,052 B2
APPLICATION NO. : 10/534250
DATED : October 20, 2009
INVENTOR(S) : Hirofumi Akagi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 391 days.

Signed and Sealed this

Fifth Day of October, 2010

David J. Kappos
*Director of the United States Patent and Trademark Office*